(12) United States Patent
Ohara et al.

(10) Patent No.: US 9,080,232 B2
(45) Date of Patent: Jul. 14, 2015

(54) ELECTROMAGNETIC VIBRATION SUPPRESSION DEVICE AND ELECTROMAGNETIC VIBRATION SUPPRESSION CONTROL PROGRAM

(75) Inventors: Hisanori Ohara, Toyohashi (JP); Kazuhisa Matsuda, Toyohashi (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 184 days.

(21) Appl. No.: 13/636,019

(22) PCT Filed: Mar. 16, 2011

(86) PCT No.: PCT/JP2011/056165
§ 371 (c)(1),
(2), (4) Date: Sep. 19, 2012

(87) PCT Pub. No.: WO2011/115153
PCT Pub. Date: Sep. 22, 2011

(65) Prior Publication Data
US 2013/0010397 A1   Jan. 10, 2013

(30) Foreign Application Priority Data

Mar. 19, 2010   (JP) ................................. 2010-064841
Mar. 19, 2010   (JP) ................................. 2010-064842

(51) Int. Cl.
*H01F 38/00*   (2006.01)
*C23C 2/24*   (2006.01)
(Continued)

(52) U.S. Cl.
CPC ... *C23C 2/24* (2013.01); *C23C 2/14* (2013.01); *C23C 2/20* (2013.01); *F16F 15/03* (2013.01); *G05D 19/02* (2013.01); *B21B 9/00* (2013.01)

(58) Field of Classification Search
USPC .......................................................... 361/143
See application file for complete search history.

(56) References Cited

U.S. PATENT DOCUMENTS 6,471,153 B1 *  10/2002  Kimura et al. ............. 242/419.3
8,062,711 B2 *  11/2011  Lofgren et al. ............... 427/433
(Continued)

FOREIGN PATENT DOCUMENTS

| | | |
|---|---|---|
| JP | 07-256341 A | 10/1995 |
| JP | 08-197139 A | 8/1996 |

(Continued)

OTHER PUBLICATIONS

International Search Report of PCT/JP2011-056165, mailing date of Jun. 14, 2011.
(Continued)

*Primary Examiner* — Thienvu Tran
*Assistant Examiner* — Angela Brooks
(74) *Attorney, Agent, or Firm* — Westerman, Hattori, Daniels & Adrian, LLP

(57) ABSTRACT

An electromagnetic vibration suppression device 1 includes a plurality of electromagnet pairs 2 (2A, 2B) disposed in the width direction of a steel sheet Sa. Each electromagnet pair is oppositely disposed in the thickness direction of the steel sheet Sa traveling in a predetermined direction. A control section 4 is adapted to control current to be applied to each electromagnet 2A, 2B to suppress the vibration of the steel sheet Sa traveling between electromagnets 2A and 2B. The control section 4 is arranged to determine an edge position Sae of the steel sheet Sa by computation based on an inputted width dimension of the steel sheet Sa and a meandering amount of the steel sheet Sa inputted therein, and separately control a current amount to be applied to the electromagnets 2A and 2B based on the edge position Sae of the steel sheet Sa.

10 Claims, 9 Drawing Sheets

(51) Int. Cl.
  *C23C 2/14* (2006.01)
  *C23C 2/20* (2006.01)
  *G05D 19/02* (2006.01)
  *F16F 15/03* (2006.01)
  *B21B 9/00* (2006.01)

(56) References Cited

U.S. PATENT DOCUMENTS

| | | | |
|---|---|---|---|
| 8,752,502 B2* | 6/2014 | Eriksson et al. | 118/672 |
| 2009/0191360 A1* | 7/2009 | Teramoto et al. | 427/595 |
| 2011/0217481 A1* | 9/2011 | Ohara et al. | 427/547 |
| 2013/0010397 A1* | 1/2013 | Ohara et al. | 361/143 |
| 2013/0319326 A1* | 12/2013 | Guastini et al. | 118/620 |
| 2013/0327806 A1* | 12/2013 | Jang et al. | 226/196.1 |
| 2014/0027216 A1* | 1/2014 | Ohara et al. | 188/267 |

FOREIGN PATENT DOCUMENTS

| | | | |
|---|---|---|---|
| JP | 10-53849 A | | 2/1998 |
| JP | 10-053849 A | | 2/1998 |
| JP | 2001162312 | * | 6/2001 |
| JP | 2002317256 | * | 10/2002 |
| JP | 2003-73792 A | | 3/2003 |
| JP | 2009-179834 A | | 8/2009 |
| JP | 2009179834 | * | 8/2009 |

OTHER PUBLICATIONS

Japanese Office Action dated Jun. 3, 2014, issued in Japanese Patent Application No. 2010-064842 (2 pages).
Chinese Office Action dated Feb. 14, 2014, issued in Chinese Patent Application No. 201180014828.7 (2 pages).

* cited by examiner

ELECTROMAGNETIC VIBRATION SUPPRESSION DEVICE AND ELECTROMAGNETIC VIBRATION SUPPRESSION CONTROL PROGRAM

TECHNICAL FIELD

The present invention relates to an electromagnetic vibration suppression device which can prevent and suppress the vibration of a steel sheet during conveyance by means of a current outputted from an electromagnet, and an electromagnetic vibration suppression control program which is applicable to such an electromagnetic vibration suppression device.

BACKGROUND ART

Conventionally, for example, in a continuous galvanizing line, excessive molten zinc is blown off by causing pressurized air or gas to be ejected from an air knife portion (for example, one configured by using an air nozzle) onto a steel sheet that travels while passing through and being drawn up from a molten zinc bath, thereby achieving a desired plating thickness. In such a case, if the steel sheet vibrates in the direction in which it moves closer to and away from the air knife portion, the distance between the nozzle and the steel sheet will fluctuate, resulting in fluctuation of the pressure (ejection force) to which the steel sheet is subjected, which causes the thickness of plating to become non-uniform, leading to deterioration of quality.

Accordingly, an electromagnetic vibration suppression device has been contrived which controls the current to be applied to electromagnets which are oppositely disposed at locations interposing the traveling steel sheet, and controls the attractive force of the electromagnets, thereby reducing the vibration of the traveling steel sheet (for example, Patent Literature 1). An electromagnetic vibration suppression device of this kind is configured such that a plurality of electromagnet pairs including electromagnets oppositely disposed in the thickness direction of the steel sheet are provided in the width direction of the steel sheet, and further, a plurality of displacement sensors for detecting a relative position (distance) with respect to the steel sheet are also provided in the width direction of the steel sheet in a combination associated with each electromagnet, so that the current to be applied to each electromagnet is controlled based on the relative position (distance) with respect to the steel sheet which is detected by each displacement sensor.

Incidentally, a steel sheet that travels between opposing electromagnets may meander in the width direction. Since the edge (end edge) position of the steel sheet changes in front of and behind of the location where meandering has occurred, a control specification for adjusting the output current to each electromagnet according to the change of the edge position is required.

Accordingly, Patent Literature 1 discloses an embodiment including displacement sensors disposed at positions opposable to the edge position of the steel and other sensors (edge position detection sensors) disposed at a predetermined pitch in the width direction of the steel sheet so as to constantly detect the edge position of the traveling steel sheet to determine whether or not the steel sheet is present by each edge position detection sensor so that when the presence of the steel sheet is detected, an electromagnet associated with the edge position detection sensor is driven and, on the other hand, when the presence of the steel sheet is not detected, the driving of the electromagnet associated with the edge position detection sensor is stopped.

Further, an attempt has been made to increase the rigidity of the steel sheet itself during conveyance, by conveying the steel sheet while keeping it curved in the width direction. In this case, the curved shape of the steel sheet on which appropriate vibration suppression control can be exerted by an electromagnetic vibration suppression device is predefined, and the electromagnetic vibration suppression device is configured such that the output current to electromagnets making up each electromagnet pair is controlled such that the steel sheet takes a desired curved shape.

CITATION LIST

Patent Literature

Patent Literature 1: Japanese Patent Laid-Open No. 2009-179834

SUMMARY OF INVENTION

Technical Problems

However, in the above described configuration in which the edge position of the traveling steel sheet is constantly detected, it is absolutely necessary to dispose a plurality of separate sensors for the purpose of detecting the edge position in addition to the displacement sensor, and it is further necessary to set a region for disposing the edge position detection sensors in consideration of a maximum amplitude (meandering amount) of the steel sheet when it meanders according to the type (sheet width or the like) of the steel sheet, leading to a potential problem that if this disposition setting is inappropriate, vibration suppression cannot be stably performed on the steel sheet, and performing appropriate control becomes difficult. Further, there is a problem in that when the number and disposition density of edge position detection sensors are increased to obtain more accurate detection results, it will incur a further complexity and higher cost of the structure. Further, although an embodiment is conceivable in which the mounting position of the edge position detection sensor is changed depending on the type of steel sheet, it will require replacement operation every time the type of steel sheet is changed, thereby reducing work efficiency.

Further, when the steel sheet traveling between opposing electromagnets meanders in the width direction, there is also risk that if control is performed while the output current to each electromagnet is kept at a desired set value, the steel sheet may take on a shape different from the desired curved shape (for example, an irregular shape which is bilaterally asymmetrical) in the thickness direction at meandering positions due to the electromagnetic attractive force of the electromagnets which is outputted at the desired set value. Accordingly, a problem is anticipated in that stable vibration suppression effects cannot be exerted on a steel sheet that travels while taking a shape different from the desired curved shape, and performing appropriate control becomes difficult.

The present invention has been made in view of the above described problems, and has a first principal object to provide an electromagnetic vibration suppression device which can appropriately suppress not only the vibration of a steel sheet that travels while keeping a normal posture, but also the vibration of a steel sheet that travels while meandering in the width direction, without requiring a sensor for detecting edge positions as an essential structure.

Further, the present invention has a second principal object to provide an electromagnetic vibration suppression device which can appropriately suppress the vibration of a steel sheet even when the steel sheet that travels while been curved in the thickness direction meanders in the width direction, by allowing the steel sheet to be conveyed while maintaining a desired curved shape.

Solution to Problems

That is, an electromagnetic vibration suppression device of a first aspect of the present invention relates to an electromagnetic vibration suppression device for suppressing vibration of a traveling steel sheet, comprising: a plurality of electromagnet pairs disposed in a width direction of a steel sheet and each including a combination of electromagnets oppositely disposed to each other in a thickness direction of the steel sheet traveling in a predetermined direction; and a control section adapted to control current to be applied to each electromagnet to suppress vibration of the steel sheet traveling between electromagnets of each of the electromagnet pairs, wherein the control section comprises edge position calculation means and current amount control means, the edge position calculation means is adapted to determine an edge position of the steel sheet by computation based on an inputted width dimension of the steel sheet and a displacement amount in a width direction of the steel sheet, the displacement amount being inputted in real time or at predetermined time intervals, and the current amount control means is adapted to separately control a current amount to be applied to the electromagnets based on the edge position of the steel sheet determined by the edge position calculation means.

Here, an output source for outputting a width dimension of steel sheet to a control section, and an output source for outputting a displacement amount in the width direction of steel sheet, that is, a meandering amount to the control section in real time or at predetermined time intervals, may be either of a separate device (for example, a host computer or the like) from the electromagnetic vibration suppression device, or a part (for example, a meandering amount detection apparatus or the like) of the electromagnetic vibration suppression device, respectively. Further, in the electromagnetic vibration suppression device of the present invention, the conveying direction of steel sheet is not specifically limited, and the steel sheet may be conveyed in any direction, such as a steel sheet configured to pass through between electromagnets while being pulled up, a steel sheet configured to pass through between electromagnets while being pulled down, or a steel sheet configured to pass through between electromagnets while moving horizontally.

According to the electromagnetic vibration suppression device such as described above, since configuration is made such that an edge position of steel sheet is determined by computation by edge position calculation means based on a width dimension of steel sheet and a meandering amount of steel sheet, and a current to be applied to each electromagnet is separately adjusted by current amount control means based on the edge position of steel sheet determined through the computing operation by the edge position calculation means, it is possible to appropriately suppress the vibration of a steel sheet traveling while keeping a normal posture and a steel sheet traveling while meandering in the width direction even without disposing a sensor for detecting the edge position thereof.

Further, in the electromagnetic vibration suppression device of the first aspect of the present invention, although the current amount control means may control the output intensity of current as the "current amount control", it is preferable, when a simple control specification is adopted, to adopt an embodiment in which the output current amount from each electromagnet is set to zero or a predetermined value not less than zero by switching the electromagnet only between an energized state and a deenergized state (turning On and Off of current).

In this case, preferable control modes by the current amount control means include one for energizing, among each electromagnet, an electromagnet which is present on the side of a widthwise center of the steel sheet with respect to the edge position of the steel sheet determined by the edge position calculation means, and deenergizing all other electromagnets.

Further, in the control section of the electromagnetic vibration suppression device of the first aspect of the present invention, it is possible to detect, with the current amount control means, an electromagnet pair in which the edge position of steel sheet determined by the edge position calculation means is present between electromagnets and, depending on where the edge position is located in the detected electromagnet pair (edge-position detecting electromagnet pair), adjust the current amount of electromagnets making up the edge-position detecting electromagnet pair. Specific control modes of the control section include an embodiment for outputting a current control signal, which is adapted to energize the electromagnets making up the edge-position detecting electromagnet pair, when it is determined that in the edge-position detecting electromagnet pair, the edge position is present on the side of the widthwise end of an electromagnet pair region, in which the plurality of electromagnet pairs are disposed, with respect to a predetermined range which is set centering on the widthwise center of each electromagnet making up the concerned electromagnet pair, and deenergize the electromagnets making up the edge-position detecting electromagnet pair, when it is determined that the edge position is present on the side of the widthwise center of the electromagnet pair region with respect to the predetermined range.

Further, an electromagnetic vibration suppression control program of a first aspect of the present invention is a program to be applied to the electromagnetic vibration suppression devices configured as described above, the program comprising: an edge position calculation step of determining an edge position of the steel sheet by computation based on an inputted width dimension of the steel sheet and a displacement amount in a width direction of the steel sheet, the displacement amount being inputted in real time, and a current amount control step of separately controlling a current amount to be applied to the electromagnets based on the edge position of the steel sheet determined in the edge position calculation step. Such an electromagnetic vibration suppression control program can suppress vibrations in a traveling steel sheet even if the steel sheet travels while meandering.

An electromagnetic vibration suppression device of a second aspect of the present invention relates to an electromagnetic vibration suppression device for suppressing vibration of a traveling steel sheet, comprising: a plurality of electromagnet pairs disposed in a width direction of a steel sheet and each including a combination of electromagnets oppositely disposed to each other in the thickness direction of the steel sheet traveling in a predetermined direction, and a control section adapted to control current to be applied to each electromagnet to suppress vibration of the steel sheet traveling between electromagnets of each of the electromagnet pairs while taking a shape curved in the opposing direction of the electromagnets, wherein the control section comprises calculation means for revised target position of steel sheet and current amount control means, the calculation means for revised target position of steel sheet is adapted to calculate a revised target position of steel sheet between electromagnets making up each electromagnet pair such that the steel sheet takes a desired curved shape, based on a displacement amount in the width direction of the steel sheet, the displacement amount being inputted in real time or at predetermined time intervals, and the current amount control means is adapted to separately control a current amount to be applied to electromagnets making up each electromagnet pair such that the steel sheet displaced in the width direction is moved to the revised target position of steel sheet in each electromagnet pair determined by the calculation means for revised target position of steel sheet.

Here, the "curve shape of steel sheet" may be exemplified by, besides a typical partial circular arc (including partial elliptic arc (bow shape)), a shape (wave-like shape, S-shape) which is made up by combining a plurality of partial circular arcs. Moreover, an output source for outputting a displacement amount in the width direction of steel sheet, that is, a meandering amount of the steel sheet to the control section in real time or at predetermined time intervals, may be either of a part (for example, a meandering amount detection apparatus, a steel sheet edge-position detection apparatus or the like) of the electromagnetic vibration suppression device, or a separate device from the electromagnetic vibration suppression device. Further, in the electromagnetic vibration suppression device of the present invention, the conveying direction of steel sheet is not specifically limited, and the steel sheet may be conveyed in any direction, such as a steel sheet configured to pass through between electromagnets while being pulled up, a steel sheet configured to pass through between electromagnets while being pulled down, or a steel sheet configured to pass through between electromagnets while moving horizontally. Furthermore, the expression "revised target position of steel sheet in each electromagnet pair" is synonymous with the expression "revised target position of steel sheet between electromagnets making up each electromagnet pair", and although, for the sake of convenience, the expression "position of steel sheet in an electromagnet pair" is also used in the following description, this expression is synonymous with the expression "position of steel sheet between electromagnets making up an electromagnet pair".

According to the electromagnetic vibration suppression device such as described above, since configuration is made such that a revised target position of steel sheet between electromagnets making up each electromagnet pair is determined by computation such that the steel sheet has a desired curved shape by the calculation means for revised target position of steel sheet based on a meandering amount of steel sheet, and a current to be applied to each electromagnet is separately adjusted by the current amount control means based on the revised target position determined through computing operation by the calculation means for revised target position of steel sheet so as to move the position of the steel sheet in each electromagnet pair to the revised target position; even when the steel sheet meanders, it is possible to guide (reform) the steel sheet into the same or substantially the same curved shape as the desired curved shape at the position where the steel sheet meanders. Therefore, according to the electromagnetic vibration suppression device of the present invention which exerts appropriate vibration suppression effect on a steel sheet that travels while taking a desired curved shape, it is possible, even for a steel sheet which has meandered, to maintain the steel sheet in the desired curved shape at the position of meandering, thereby appropriately suppressing the vibration of a steel sheet traveling while meandering.

Further, an electromagnetic vibration suppression device of a second aspect of the present invention may be configured such that a curved shape of a steel sheet at a time before it is displaced in a width direction, that is, a desired curved shape of the steel sheet is approximated by a straight line linking desired revised target positions of the steel sheet in adjacent electromagnet pairs so that the calculation means for revised target position of steel sheet calculates a revised target position of steel sheet for each electromagnet pair by utilizing: each desired revised target position of steel sheet in the electromagnet pair for which a revised target position of steel sheet is determined, and an electromagnet pair adjacent to the concerned electromagnet pair; a displacement amount in the width direction of the steel sheet; and a distance between adjacent electromagnet pairs. Here, a "desired revised target position of steel sheet in each electromagnet pair" is a revised target position of steel sheet which is set in advance or in real time for each electromagnet pair so that a steel sheet takes a desired curved shape in a non-meandering state. As a specific example of the "desired revised target position of steel sheet in each electromagnet pair", when a steel sheet having a bilaterally symmetrical, partial circular-arc shape is conveyed by an electromagnetic vibration suppression device in which five electromagnet pairs are disposed at a predetermined pitch in the width direction of the steel sheet, and the middle electromagnet pair is coincident or substantially coincident with the widthwise center of the steel sheet which is not meandering, the desired revised target position of the steel sheet in each electromagnet pair at both ends is coincident or substantially coincident with the direction in which electromagnets making up each electromagnet pair are opposed to each other, and the desired revised target position of the steel sheet in each electromagnet pair adjacent to the electromagnet pairs at both ends (the second and fourth electromagnet pairs, if it is assumed that there are the first, second, third, fourth, and fifth electromagnet pairs from one side) is coincident or substantially coincident with the direction in which electromagnets making up each electromagnet pair are opposed to each other.

The electromagnetic vibration suppression device of the second aspect of the present invention is based on a technical idea that if a desired curved shape of steel sheet is approximated in a shape linking desired revised target positions of steel sheet by straight lines in adjacent electromagnet pairs, and even when the steel sheet meanders, the shape of the steel sheet approximated by straight lines is maintained in a state of being moved in parallel in the width direction of the steel sheet, the steel sheet will have the same or substantially the same shape as the desired curved shape even at the position of meandering; and is configured such that a revised target position of steel sheet in each electromagnet pair can be calculated respectively by the calculation means for revised target position of steel sheet by utilizing the desired revised target position of steel sheet at each electromagnet pair, the distance between adjacent electromagnet pairs, and the meandering amount of steel sheet which is inputted in real time or at predetermined time intervals. According to such an embodiment, by only utilizing the "meandering amount of steel sheet" which is inputted in real time or at predetermined time intervals, in addition to the "desired revised target position of steel sheet at each electromagnet pair" and the "distance between adjacent electromagnet pairs", which are predefined default values, the revised target position of steel sheet at each electromagnet pair can be determined by the calculation means for revised target position of steel sheet with a small calculation amount.

An example of preferable computing operation in the calculation means for revised target position of steel sheet includes a computing operation in which a revised target position of steel sheet in an electromagnet pair for which the revised target position of steel sheet is determined (hereafter, referred to as "revised target position calculating electromagnet pair"), and a desired revised target position of steel sheet in an electromagnet pair adjacent to the revised target position calculating electromagnet pair, are determined respectively as coordinates on a common plane to calculate the difference between these coordinates, more specifically, the difference between the coordinates along the opposing direction of electromagnets making up each electromagnet pair, and also the difference between the revised target position of steel sheet in the revised target position calculating electromagnet pair and the desired revised target position of steel sheet in the electromagnet pair adjacent to the revised target position calculating electromagnet pair so that the revised target position of steel sheet in each electromagnet pair is respectively determined by taking advantage of the fact that a first relative ratio which is the ratio of the two calculated differences is equal to a second relative ratio which is the ratio of a separation distance of adjacent electromagnet pairs and a value calculated by subtracting a displacement amount (meandering amount) in the width direction of steel sheet from the separation distance.

Further, in the electromagnetic vibration suppression device of the second aspect the present invention, although the current amount control means may control the output intensity of current as the "current amount control", it is preferable, when a simple control specification is adopted, to adopt an embodiment in which the output current amount from each electromagnet is set to zero or a predetermined value not less than zero by switching the electromagnet only between an energized state and a deenergized state (turning On and Off of current).

Further, the electromagnetic vibration suppression control program of the second aspect of the present invention is a program to be applied to an electromagnetic vibration suppression device configured as described above, the program comprising: a calculation step for revised target position of steel sheet of calculating a revised target position of steel sheet between electromagnets making up each electromagnet pair such that the steel sheet takes a desired curved shape, based on a displacement amount in the width direction of the steel sheet, the displacement amount being inputted in real time or at predetermined time intervals, and a current amount control step of separately controlling a current amount to be applied to electromagnets making up each electromagnet pair such that the steel sheet displaced in the width direction is moved to the revised target position of steel sheet in each electromagnet pair determined in the calculation step for revised target position of steel sheet. Such an electromagnetic vibration suppression control program allows a steel sheet that travels while meandering to be conveyed while maintaining its desired curved shape, and can effectively suppress the vibration during traveling.

Advantageous Effects of Invention

According to an electromagnetic vibration suppression device and program of a first aspect of the present invention, it is possible not only to appropriately suppress the vibration of a steel sheet that travels while keeping a normal posture, but also to effectively suppress the vibration of a steel sheet that travels while meandering without adopting a structure that requires a dedicated edge position detection sensor.

According to an electromagnetic vibration suppression device and program of a second aspect of the present invention, it is possible not only to suppress the vibration of a steel sheet that travels while keeping a desired curved shape without meandering, but also to effectively suppress the vibration of a steel sheet that travels while keeping a curved shape with meandering.

DESCRIPTION OF EMBODIMENTS

Hereafter, a first embodiment corresponding to an electromagnetic vibration suppression device of a first aspect of the present invention will be described with reference to the drawings.

Figure 1:
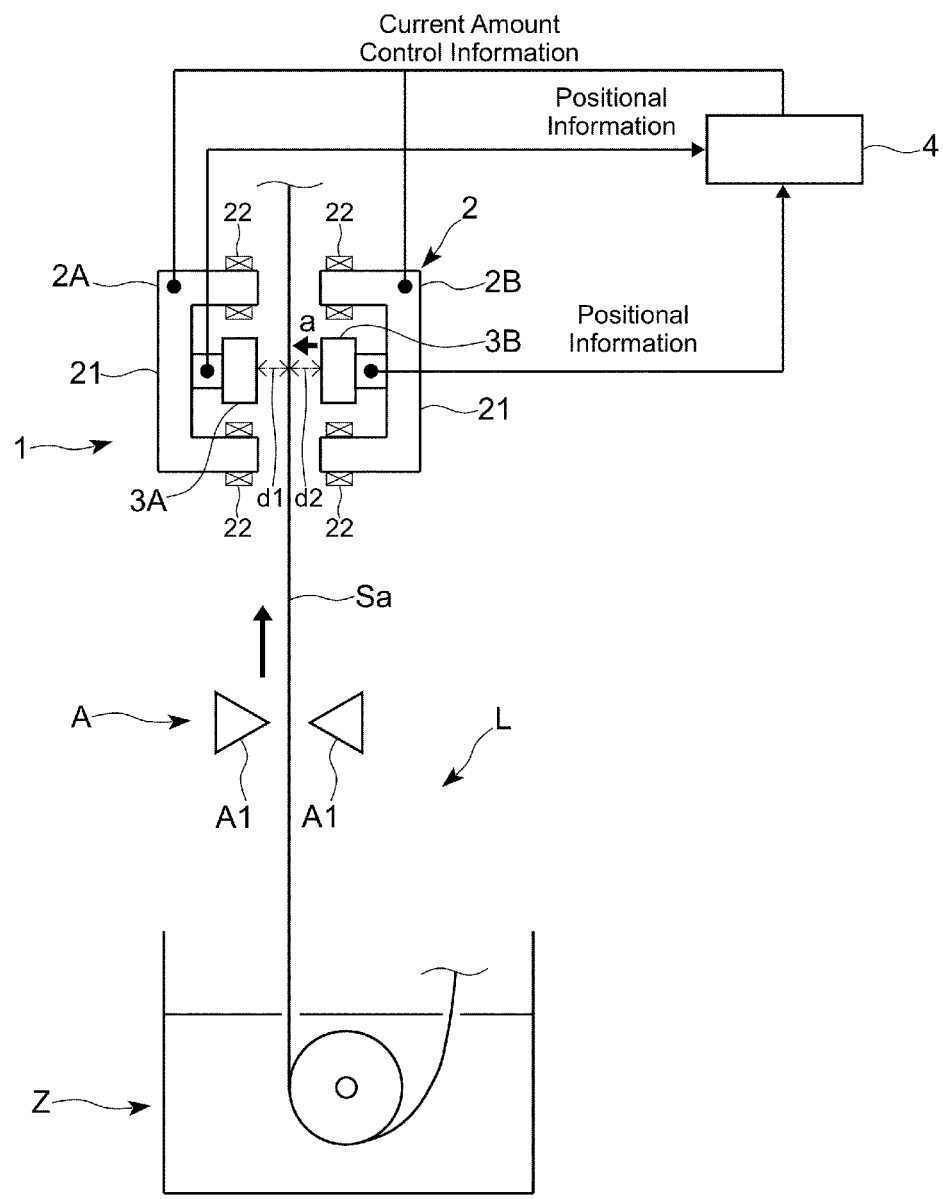
FIG. 1 is a schematic view of the general configuration of an electromagnetic vibration suppression device relating to a first embodiment of the present invention.

An electromagnetic vibration suppression device 1 relating to the present embodiment is arranged on the downstream side of a molten metal bath (a molten zinc bath Z is applied in the embodiment) in a steel sheet continuous plating line L as shown in FIG. 1, and suppresses the vibration of a steel sheet Sa that travels while passing through and being drawn up from the molten zinc bath Z. Moreover, FIG. 1 schematically shows the steel sheet Sa seen from side, and FIG. 2 schematically shows a view on arrow "a" of FIG. 1.

The steel sheet continuous plating line L (particularly, a steel sheet plating line using molten zinc is referred to as a "continuous galvanizing line (CGL)") is configured such that an air knife portion A including a nozzle A1 of which ejection hole is oriented toward the steel sheet Sa is provided between the molten zinc bath Z and the electromagnetic vibration suppression device 1, and pressurized air or gas is ejected from the ejection hole of each nozzle A1 against the steel sheet Sa which travels while passing through and being drawn up from the molten zinc bath Z, thereby blowing off excessive molten zinc. The molten zinc bath Z and the air knife portion A can be known types, and detailed description thereof will be omitted.

Figure 2:
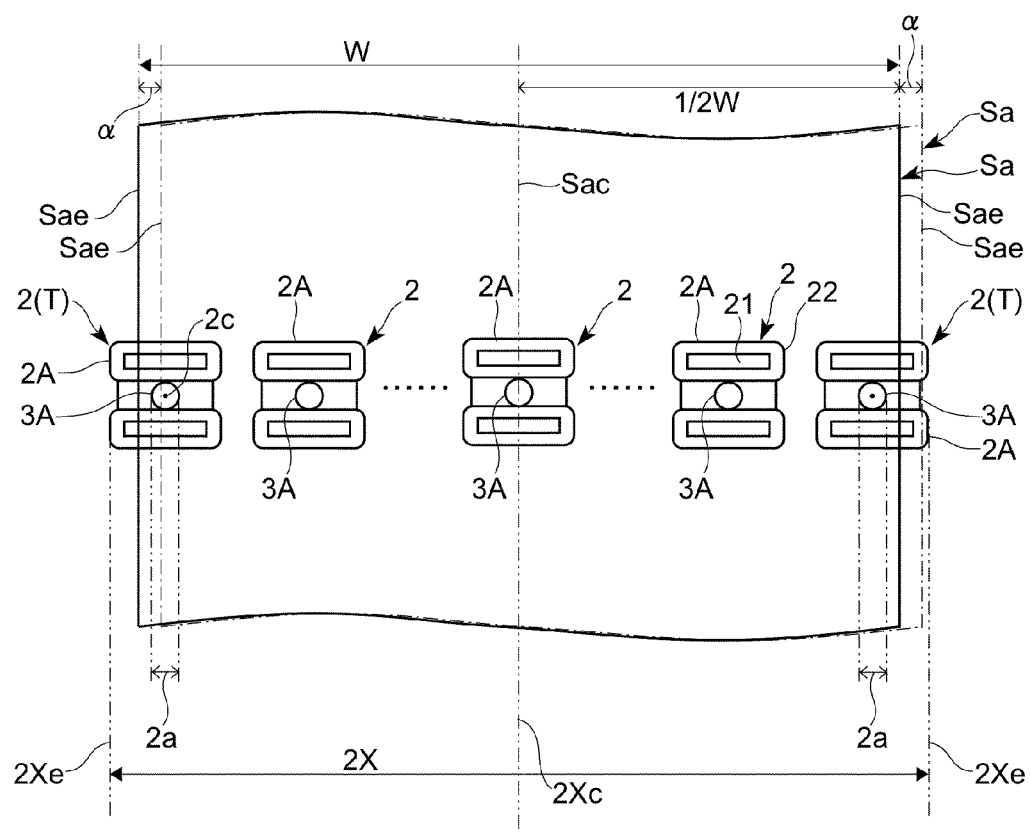
FIG. 2 is a schematic view on arrow "a" of FIG. 1.

The electromagnetic vibration suppression device 1 is configured such that a plurality of electromagnet pairs 2, each of which is a combination of a first electromagnet 2A and a second electromagnet 2B, which are oppositely disposed at locations so that the steel sheet Sa can be interposed in the thickness direction, are disposed at a predetermined pitch in the width direction of the steel sheet Sa as shown in FIGS. 1 and 2. The first electromagnet 2A and the second electromagnet 2B which make up each electromagnet pair 2 are each made up of an iron core 21 having a cross-section of C shape or substantially C shape, and a coil 22 which is wound around each leg portion of the iron core 21; and each of which is a known type and is switchable between an energized state in which magnetic attraction force can be outputted from the iron core 21 and a non-energized state in which no magnetic attraction force is outputted from the iron core 21, depending on whether or not power is to be supplied to the coil 22. In the present embodiment, as shown in FIG. 2, a plurality of electromagnet pairs 2 are arranged at a predetermined pitch in the width direction of the steel sheet Sa, and in the following description, a region where these plurality of electromagnet pairs 2 are arranged is referred to as an "electromagnet pair region 2X."

Further, the electromagnetic vibration suppression device 1 is provided with a first sensor 3A and a second sensor 3B for detecting the distance to the steel sheet Sa in a plane opposite to the steel sheet Sa in each first electromagnet 2A and each second electromagnet 2B. In the present embodiment, for example, eddy current type sensors 3A and 3B are applied and these sensors 3A and 3B are disposed in a concave portion (a position interposable by the leg portions of the iron core 21) of each electromagnet 2A, 2B. The first sensor 3A and the second sensor 3B are provided at opposing locations interposing the steel sheet Sa with their detection surfaces being set coplanar or substantially coplanar with the pole faces of the corresponding electromagnets 2A and 2B respectively. The first sensor 3A and the second sensor 3B detect distances d1 and d2 to the steel sheet Sa, and output respective detection results to the control section 4 as detection signals. Further, in the present embodiment, setting is made such that the sensors 3A and 3B can detect the distance to the steel sheet Sa only in a state where the entire detection surface of the sensor 3A, 3B is completely, or substantially completely covered with the steel sheet Sa.

Then, the electromagnetic vibration suppression device 1 relating to the present embodiment includes a control section 4 which is electrically connected to the electromagnets 2A and 2B of each electromagnet pair 2 to control the electromagnetic attraction force of each of the electromagnets 2A and 2B based on the current amount to be applied to each electromagnet 2A, 2B. The electromagnetic vibration suppression device 1 relating to the present invention is similar to a known electromagnetic vibration suppression device in the point that the control section 4 is electrically connected to each sensor 3A, 3B as well, and the point that the magnetic attraction force of each electromagnet 2A, 2B is controlled so as to suppress the vibration of the steel sheet Sa based on the positional information of the steel sheet Sa (vibration information of the steel sheet Sa) detected by each sensor 3A, 3B, but is different from a known electromagnetic vibration suppression device in the following points.

Figure 3:
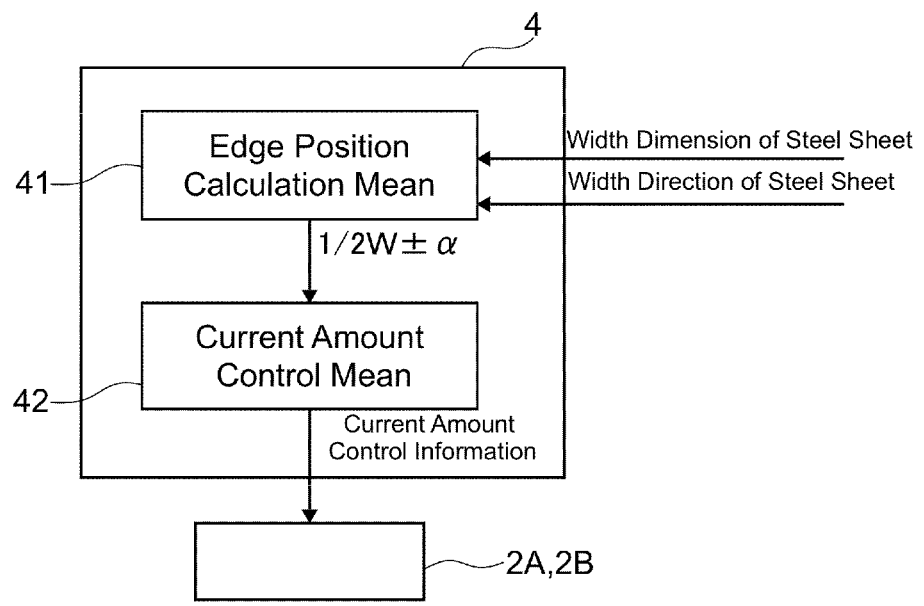
FIG. 3 is a functional block diagram of a control section in the electromagnetic vibration suppression device relating to the same embodiment.

That is, the control section 4 in the electromagnetic vibration suppression device 1 of the present embodiment includes, as shown in FIG. 3, edge position calculation means 41 for determining an edge position Sae of the steel sheet Sa by computation based on an inputted width dimension of the steel sheet Sa and a displacement amount (meandering amount) in the width direction of the steel sheet Sa which is inputted in real time, and current amount control means 42 for separately controlling the current amount to be applied to the electromagnets 2A and 2B based on the edge position Sae of the steel sheet Sa determined by the edge position calculation means 41.

The present embodiment is configured such that information on the line L side, that is, information relating to the traveling steel sheet Sa, such as a sheet thickness, sheet width, kind of steel, and tensile force is inputted to the control section 4 from a host computer (not shown) electrically connected to the electromagnetic vibration suppression device 1. Further, configuration is such that a meandering amount (meandering amount information) of the steel sheet Sa based on the edge position Sae of the steel sheet Sa detected by an apparatus such as, for example, an edge position detector (not shown) electrically connected to the electromagnetic vibration suppression device 1 is inputted to the control section 4 in real time from a system including apparatuses such as an edge position detector. Furthermore, the detection of the edge position by the edge position detection apparatus and the inputting to the control section from the system including apparatuses such as the edge position detector can be performed at every predefined, fixed time intervals.

The edge position calculation means 41 determines the edge position Sae of the steel sheet Sa traveling in the electromagnet pair region 2X by computation based on the width dimension information of the steel sheet Sa and the meandering amount information of the steel sheet Sa. When the steel sheet Sa travels in the electromagnet pair region 2X while keeping a normal posture without meandering (hereafter, referred to as an "normal posture"), the widthwise center Sc of the steel sheet Sa is coincident with the widthwise center 2Xc of the electromagnet pair region 2X as shown by a solid line in FIG. 2, and the edge position Sae of the steel sheet Sa is coincident or substantially coincident with a location which is apart from the widthwise center Sc of the steel sheet Sa (=the widthwise center 2Xc of the electromagnet pair region 2X) by a distance equal to a half (½) of the width dimension of the steel sheet Sa. Here, representing the width dimension of the steel sheet Sa by "W", the edge position Sae of the steel sheet Sa which is conveyed while keeping a normal posture can be represented as "½W" with the reference to the widthwise center 2Xc of the electromagnet pair region 2X.

Accordingly, in the edge position calculation means 41, computing operation can be performed with an actual meandering amount as " " to determine the edge position Sae of the steel sheet Sa as "½W". That is, as shown by a chain line of FIG. 2, in the edge position calculation means 41, when the edge position Sae of the steel sheet Sa which is inputted in real time is apart from the widthwise center of the disposition region of the electromagnet pair 2 by a distance with respect to the edge "½W" of the steel sheet Sa which is conveyed while keeping a normal posture, the edge position Sae can be determined as "½W+", and when the edge position Sae of the steel sheet Sa which in inputted in real time is closer to the widthwise center of the disposition region of the electromagnet pair 2 by a distance with respect to the edge "½W" of the steel sheet Sa which is conveyed while keeping a normal posture, the edge position Sae can be determined as "½W−".

The current amount control means 42 detects which electromagnet pair 2 disposes the edge position Sae between the electromagnets 2A and 2B, the edge position Sae being obtained by the formula "½W±α" in the edge position calculation means 41. The electromagnet pair 2 thus detected is referred to as "edge-position detecting electromagnet pair 2(T)." Then, a driving condition is made on the electromagnet s2A, 2B making up the electromagnet pairs 2 located at a side closer to the widthwise center 2Xc of the electromagnet pair region 2X than the edge-position detecting electromagnet pair 2(T), while a non-driving condition is made on the other electromagnets 2A, 2B located at a side closer to the widthwise end 2Xe of the electromagnet pair region 2X than the edge-position detecting electromagnet pair 2(T).

Further, the current amount control means 42 of the present embodiment determines whether or not the edge position Sae is on the side of the widthwise end 2Xe of the electromagnet pair region 2X with respect to a predetermined range 2a which is set centering on widthwise center 2c of electromagnets 2A and 2B making up the concerned edge-position detecting electromagnet pair 2(T) in the edge-position detecting electromagnet pair 2(T) at the same time or at substantially the same time it detects the electromagnet pair 2 in which the concerned edge position "½W" is present between the electromagnets 2A and 2B based on the "½W" which is the edge position Sae of the steel sheet Sa determined by the edge position calculation means 41. Then, the current amount control means 42 energizes (turns On) the electromagnets 2A and 2B making up the edge-position detecting electromagnet pair 2(T) when having determined that the edge position Sae of the steel sheet Sa is present on the side of the widthwise end 2Xe of the electromagnet pair region 2X with respect to the predetermined range 2a (the edge position Sae of the steel sheet Sa shown on the right hand side and by a chain line in FIG. 2) and, on the other hand, deenergizes (turns Off) the electromagnets 2A and 2B making up the edge-position detecting electromagnet pair 2(T) when having determined that the edge position Sae of the steel sheet Sa is not present on the side of the widthwise end 2Xe of the electromagnet pair region 2X with respect to the predetermined range 2a (the edge position Sae of the steel sheet Sa shown on the left hand side and by a chain line in FIG. 2). Here, the case where the current amount control means 42 determines that the edge position Sae of the steel sheet Sa is not present on the side of the widthwise end 2Xe of the electromagnet pair region 2X with respect to the predetermined range 2a refers to the case where the edge position Sae of the steel sheet Sa is present within the above described predetermined range 2a (the edge position Sae of the left hand side of the steel sheet Sa shown by a chain line of FIG. 2), or the case where the edge position Sae of the steel sheet Sa is present on the side of the widthwise center 2Xc of the electromagnet pair region 2X (not shown) with respect to the above described predetermined range 2a. In the present embodiment, the sensors 3A and 3B are disposed at the widthwise center 2c of the electromagnets 2A and 2B in each electromagnet pair 2, and a range corresponding to the width dimension of the sensors 3A and 3B is set to the "predetermined range 2a". Furthermore, the size of the "predetermined range" which is set with the widthwise center 2c of the electromagnets 2A and 2B making up the edge-position detecting electromagnet pair 2(T) as the center may be appropriately changed.

Further, the control section 4 of the present embodiment controls the magnitude of current amount to be applied to the electromagnets 2A and 2B which are energized so as to straighten the warping of the steel sheet Sa based on the distance between the steel sheet Sa and each electromagnet 2A, 2B detected by each sensor 3A, 3B, that is, vibration information of the steel sheet Sa (whether or not the steel sheet Sa is vibrating, and when it is vibrating, the level of vibration (vibration amount)), thereby suppressing the vibration of the steel sheet Sa. Further, although the control section 4 includes, though not shown, a controller to which output signals from each sensor 3A, 3B are inputted, a sequencer which outputs an instruction or the like relating to the control gain to the controller, and a first and second amplifiers which supply current to each electromagnet 2A, 2B respectively based on an instruction relating to the current to be applied to each electromagnet 2A, 2B and outputted from the controller (current amount control information (current amount control signal)), detailed description of such controller, sequencer, and each amplifier will be omitted.

Next, the use method and operation of the electromagnetic vibration suppression device 1 having the above described configuration will be described.

Figure 4:
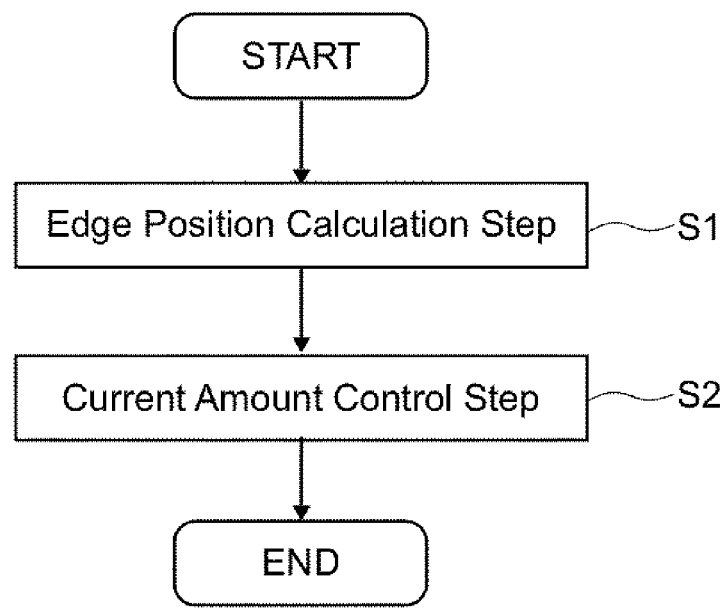
FIG. 4 is a flowchart of an electromagnetic vibration suppression control program to be used in the electromagnetic vibration suppression device relating to the same embodiment.

First, upon activation of the electromagnetic vibration suppression device 1, as shown in FIG. 1, at least width dimension information of the steel sheet Sa and real time meandering amount information of the steel sheet Sa are inputted to the control section 4 regarding the steel sheet Sa that travels between the first electromagnet 2A and the second electromagnet 2B while passing through and being drawn up from the molten zinc bath Z. Then, an electromagnetic vibration suppression program relating to the present embodiment is executed to activate each section as described below. That is, the control section 4 determines the edge position Sae of the steel sheet Sa based on the width dimension information of the steel sheet Sa and the meandering amount information of the steel sheet Sa through computation by the edge position calculation means 41 (edge position calculation step S1: see FIG. 4). Next, the control section 4 separately controls the current amount to be applied to the electromagnets 2A and 2B (whether or not to energize at least the electromagnets 2A and 2B of each electromagnet pair 2) based on "½W" which is the edge position Sae of the steel sheet Sa which is determined by computation through the edge position calculation step S1 with the edge position calculation means 41 (current amount control step S2; see FIG. 4). To be specific, an electromagnet pair 2 in which the edge position Sae of the steel sheet Sa determined by the edge position calculation means 41 is present between the electromagnets 2A and 2B is determined. Then, in the detected electromagnet pair 2 (the edge-position detecting electromagnet pair 2(T)), it is determined whether or not the edge position Sae of the steel sheet Sa is present on the side of the widthwise end 2Xe of the electromagnet pair region 2X with respect to the predetermined range 2a centering on the widthwise center 2c of the electromagnets 2A and 2B making up the edge-position detecting electromagnet pair 2(T). When it is determined that the edge position Sae of the steel sheet Sa is present on the side of the widthwise end 2Xe of the electromagnet pair region 2X with respect to the predetermined range 2a, the control section 4 outputs current amount control information (here, the "current amount control information" corresponds to the "current amount control signal" of the present invention) to energize the electromagnets 2A and 2B making up the edge-position detecting electromagnet pair 2(T), to the electromagnets 2A and 2B. On the other hand, when it is determined that the edge position Sae of the steel sheet Sa is not present on the side of the widthwise end 2Xe of the electromagnet pair region 2X with respect to the predetermined range 2a, the control section 4 outputs current amount control information to deenergize the electromagnets 2A and 2B making up the edge-position detecting electromagnet pair 2(T), to the electromagnets 2A and 2B. Further the current amount control means 42 outputs current amount control information to energize each electromagnet 2A, 2B making up a plurality of electromagnet pairs 2 which are disposed between an electromagnet pair 2 which is determined that one edge position Sae of the steel sheet Sa is present between the electromagnets 2A and 2B, and another electromagnet pair 2 which is determined that the other edge position Sae of the steel sheet Sa is present between the electromagnets 2A and 2B, to each electromagnet 2A, 2B. As the result of the above described procedure, it is possible to perform On/Off control of each electromagnet 2A, 2B without requiring a sensor for detecting the edge position Sae of the steel sheet Sa.

Further, in the electromagnetic vibration suppression device 1 of the present embodiment, a first sensor 3A and a second sensor 3B which are associated with the electromagnets 2A and 2B detect in real time the distance to the steel sheet Sa, that is, the position in the thickness direction of the steel sheet Sa respectively (the vibration information of the steel sheet Sa) for the steel sheet Sa that travels between the first electromagnet 2A and the second electromagnet 2B, which are energized based on the current amount control information, while passing through and being drawn up from the molten zinc bath Z, and outputs respective detection information (vibration information of the steel sheet Sa) to the control section 4. Based on these detection information (vibration information of the steel sheet Sa), the control section 4 outputs current amount control information relating to the magnitude of the current amount to be applied to each of the first electromagnet 2A and the second electromagnet 2B which are energized to the electromagnets 2A and 2B. Thus, the present embodiment is configured such that only the positional information in the thickness direction of the steel sheet Sa, that is, the vibration information of the steel sheet Sa is detected by the sensors 3A and 3B, and the magnitude of the current amount to be applied to the respective electromagnets 2A and 2B is controlled based on the vibration information in the control section 4. Then, based on the current amount control information relating to the magnitude of current amount outputted from the control section 4, the current amount to be applied to the first electromagnet 2A and the second electromagnet 2B is controlled so that the steel sheet Sa is guided so as to approach the intermediate position between the first electromagnet 2A and the second electromagnet 2B by the magnetic attraction force of respective electromagnets 2A and 2B, and thus the vibration during traveling is suppressed.

Therefore, it is possible to maintain the distance between the steel sheet Sa traveling while passing through and being drawn up from the molten zinc bath Z and an ejection hole of each nozzle A1 making up the air knife portion A within a fixed range, thereby preventing the fluctuation of the ejection force acting on the steel sheet Sa and achieving a uniform or substantially uniform plating thickness.

Thus, since the electromagnetic vibration suppression device 1 relating to the present embodiment uses a control section 4 which includes: edge position calculation means 41 for determining the edge position Sae of the steel sheet Sa by computation based on the inputted width dimension of the steel sheet Sa and the displacement amount in the width direction of the steel sheet Sa which is inputted in real time, and current amount control means 42 for separately controlling the electromagnets 2A and 2B to be energized (turned On) or deenergize (turned Off) based on the edge position Sae of the steel sheet Sa determined by the edge position calculation means 41, there is neither need of disposing a sensor for detecting edge position Sae aside from the sensors 3A and 3B for detecting the position information in the thickness direction of the steel sheet Sa (the vibration information of the steel sheet Sa), nor of also using the sensors 3A and 3B for detecting the position information in the thickness direction (vibration information of the steel sheet Sa) of the steel sheet Sa as a sensor for detecting the edge position Sae, and it is possible to appropriately and securely control whether or not to energize each electromagnet 2A, 2B based on the edge position information of the steel sheet Sa determined by the edge position calculation means 41, and to efficiently suppress the vibration of the steel sheet Sa traveling while keeping a normal posture and the steel sheet Sa traveling while meandering in the width direction, thereby providing excellent practical usability. Therefore, when such electromagnetic vibration suppression device 1 is arranged in a steel sheet continuous plating line L together with an air knife portion A that blows off excessive molten metal adhered to the steel sheet Sa, the vibration of the steel sheet Sa that travels while keeping a normal posture can be effectively suppressed by the electromagnetic vibration suppression device 1 so that it becomes possible to maintain the distance between the steel sheet Sa and the air knife portion A within a fixed range, and prevent the fluctuation of the ejection force acting on the steel sheet Sa, thereby achieving uniform or substantially uniform plating thickness.

Furthermore, since the electromagnetic vibration suppression program relating to the present embodiment undergoes an edge position calculation step S1 of determining an edge position Sae of the steel sheet Sa by computation based on an inputted width dimension of the steel sheet Sa and a meandering amount of the steel sheet Sa which is inputted in real time, and a current amount control step S2 of separately controlling whether or not to energize the electromagnets 2A and 2B based on the edge position Sae of the steel sheet Sa determined at the edge position calculation step S1, it is possible, as described above, to appropriately suppress the vibration of the steel sheet Sa that travels while keeping a normal posture and the steel sheet Sa that travels while meandering in the width direction.

It is noted that the electromagnetic vibration suppression device of the first aspect of the present invention is not limited to the above described embodiment. For example, the output source for outputting the width dimension of steel sheet to the control section, and the output source for outputting in real time the meandering amount of steel sheet to the control section may be either a separate device from the electromagnetic vibration suppression device or a part of the electromagnetic vibration suppression device, respectively. Further, configuration may be such that the current amount control means controls the current amount of an electromagnet by adjusting the output intensity (magnitude of the current amount to be applied to the electromagnet) in addition to turning On or Off the current output (energize or deenergize the electromagnet), or in place of turning On or Off the current output. Particularly, when the current amount control means is configured not to be a type that controls the switching on or off of the current output, but to be a type that adjusts the output intensity without turning Off the current output (deenergize the electromagnets), in place of the off state (deenergized state of electromagnet) of current output in the above described first embodiment, it is desirable to apply a very weak current so that the steel sheet between electromagnet pairs is not moved in the width direction by magnetic attraction force of an electromagnet, and even if it is moved, the steel sheet is moved over only a negligibly small amount of distance. Since performing such current control will result in that a very weak current is constantly outputted even in a state in which the steel sheet is not moved in the width direction, compared with the case of the first embodiment in which the On or Off control of the current output is performed, the responsibility when raising the current output so as to move the steel sheet in the width direction by a desired distance will improve, allowing the vibration suppression control efficiency of the steel sheet to be increased.

It is possible to appropriately change the number of electromagnet pairs and the pitch between electromagnet pairs adjacent to each other in the width direction. Further, the width dimension of the electromagnet pair region may vary appropriately depending on the changes of the number of electromagnet pairs and the pitch between electromagnet pairs.

Further, the electromagnetic vibration suppression device may not be provided with sensors associated with the respective electromagnets. This case corresponds to a sensor-less electromagnetic vibration suppression device.

Further, although in the above described first embodiment, the molten metal bath is exemplified by a molten zinc bath; in place of this, for example, a bath that stores for example molten tin or aluminum, or resin paint may be applied. The electromagnetic vibration suppression device of the present invention may adopt as the surface coating treatment on a steel sheet, besides coating by plating, other surface coating treatment such as surface coloring processing in which surface coating treatment is performed by spraying an appropriate surface treatment material on a steel sheet.

Furthermore, the electromagnetic vibration suppression device of the first aspect of the present invention may be a device for controlling the suppression of vibration of a steel sheet which is configured to pass through between electromagnets while being pulled down after subjected to a surface coating treatment, or a device for controlling the suppression of vibration of a steel sheet which is configured to pass through between electromagnets while being moved horizontally after subjected to a surface coating treatment. Further, although a case where the steel sheet passing through between electromagnets takes a vertical posture has been described in the above described embodiment, in the first aspect of the present invention, the steel sheet may be configured to pass through between electromagnets while taking a posture other than a vertical posture, for example, either of a horizontal posture and a slanted posture.

Besides, specific configuration of each part will not be limited to the above described first embodiment, but various modifications may be made within a range not departing from the spirit of the first aspect of the present invention.

Hereafter, a second embodiment corresponding to an electromagnetic vibration suppression device of a second aspect of the present invention will be described with reference to the drawings.

Figure 5:
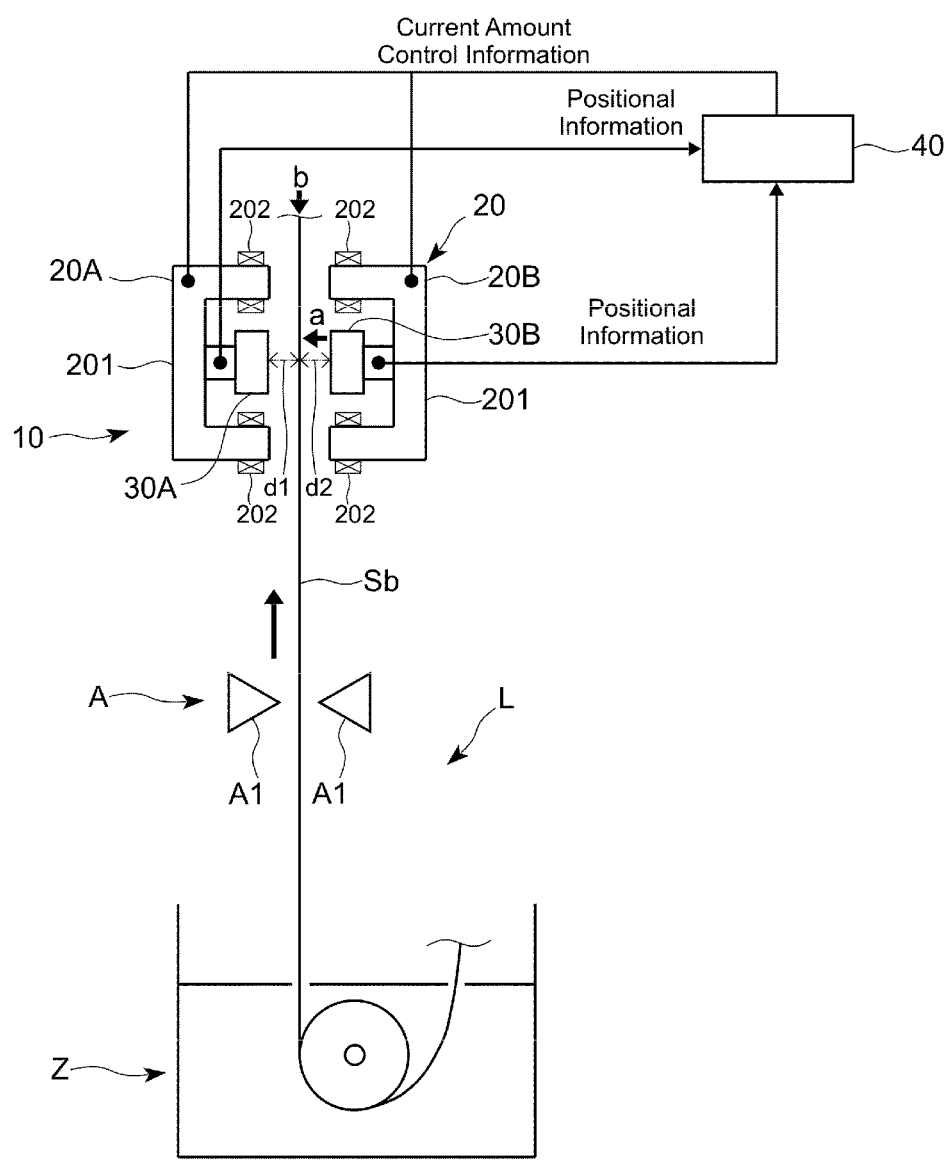
FIG. 5 is a schematic view of the general configuration of an electromagnetic vibration suppression device relating to a second embodiment of the present invention.
Figure 6:
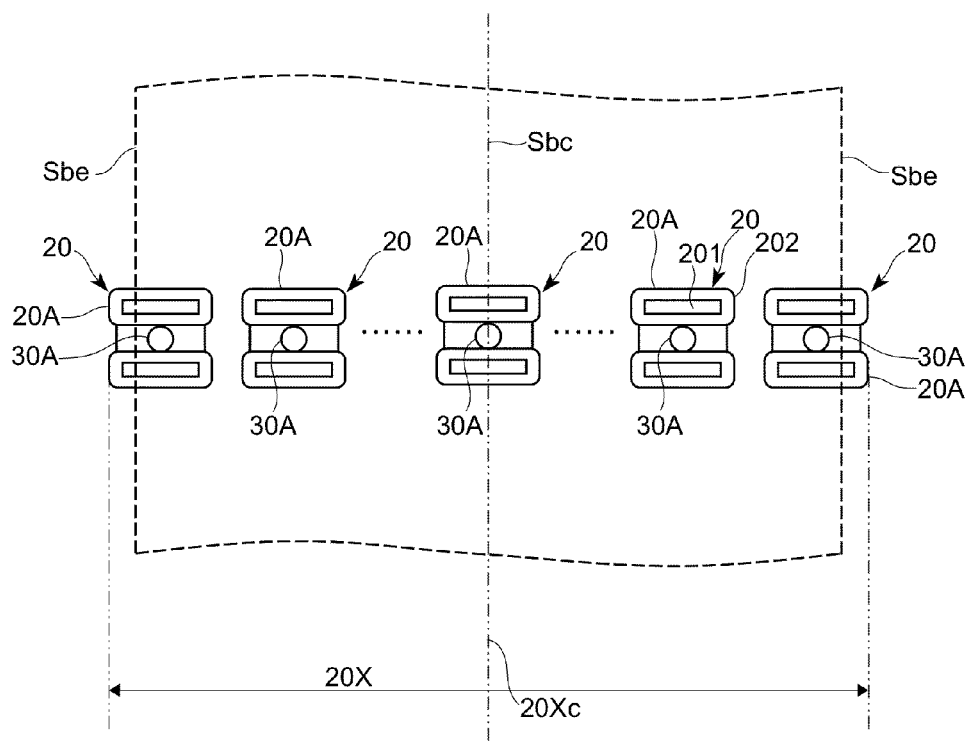
FIG. 6 is a schematic view on arrow "a" of FIG. 5.
Figure 7:
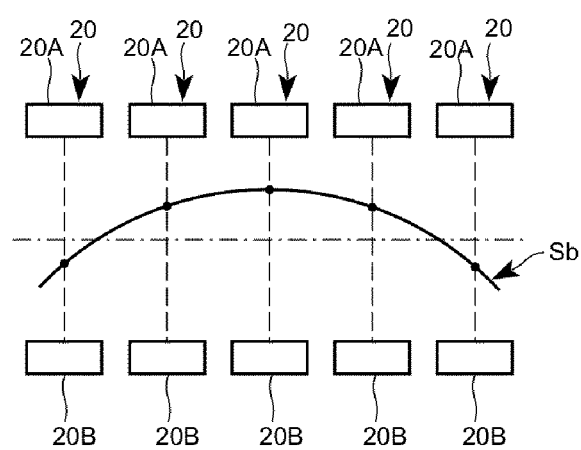
FIG. 7 is a schematic view on arrow "b" of FIG. 5.

An electromagnetic vibration suppression device 10 relating to the present embodiment is disposed on the downstream side of a molten metal bath (a molten zinc bath Z is applied in the embodiment) in a steel sheet continuous plating line L as shown in FIG. 5, and suppresses the vibration of a steel sheet Sb that travels while passing through and being drawn up from the molten zinc bath Z. Moreover, FIG. 5 schematically shows the steel sheet Sb seen from side, and FIG. 6 schematically shows a view on arrow "a" of FIG. 5. Moreover, FIG. 7 is a schematic diagram to show the traveling steel sheet Sb seen from above (the "b" direction of FIG. 5). Further, although the steel sheet Sb is conveniently represented by one solid line in FIG. 5, the electromagnetic vibration suppression device 10 relating to the present embodiment can exert vibration suppression effects on a steel sheet Sb that travels in a predetermined direction while taking a shape curved in the thickness direction as shown in FIG. 7. Particularly, the electromagnetic vibration suppression device 10 of the present embodiment can exert stable vibration suppression effects on a steel sheet Sb which is curved into a partial circular-arc shape (partial elliptic-arc shape) as shown in FIG. 7.

The steel sheet continuous plating line L (particularly, a steel sheet plating line using molten zinc is referred to as a "continuous galvanizing line (CGL)") is configured such that an air knife portion A including a nozzle A1 of which ejection hole is oriented toward the steel sheet Sb is provided between the molten zinc bath Z and the electromagnetic vibration suppression device 10, and pressurized air or gas is ejected from the ejection hole of each nozzle A1 against the steel sheet Sb which travels while passing through and being drawn up from the molten zinc bath Z, thereby blowing off excessive molten zinc. The molten zinc bath Z and the air knife portion A can be known types, and detailed description thereof will be omitted. It is noted that in the present embodiment, the line L, the air knife portion A, and the molten zinc bath Z will be described by using symbols in common with the first embodiment.

The electromagnetic vibration suppression device 10 is configured such that a plurality of electromagnet pairs 20 (five or more electromagnet pairs 20 in FIG. 6, and for the sake of convenience, five electromagnet pairs 20 in FIG. 7), each of which is a combination of a first electromagnet 20A and a second electromagnet 20B, which are oppositely disposed at locations so that the steel sheet Sb can be interposed in the thickness direction, are disposed at a predetermined pitch in the width direction of the steel sheet Sb as shown in FIGS. 6 and 7. It is noted that in FIG. 6, the steel sheet Sb which is actually present on the near side is shown by a dotted line. The first electromagnet 20A and second electromagnet 20B which make up each electromagnet pair 20 are each made up of an iron core 201 having a cross-section of C shape or substantially C shape, and a coil 202 which is wound around each leg portion of the iron core 201; and each of which is a known type switchable between an energized state, in which magnetic attraction force can be outputted from the iron core 201 depending on whether or not power is to be supplied to the coil 202, and a non-energized state, in which no magnetic attraction force is outputted from the iron core 201. In the present embodiment, a plurality of electromagnet pairs 20 are arranged at a predetermined pitch in the width direction of the steel sheet Sb, and configuration is made such that when the steel sheet Sb travels in the electromagnet pair region 20X while keeping a normal state of posture without meandering (hereafter, referred to as a "normal posture"), the widthwise center Sbc of the steel sheet Sb is coincident with the widthwise center 20Xc of the region where a plurality of electromagnet pairs 20 are arranged (electromagnet pair region) 20X as shown in FIG. 6, and when an odd number of three or more of electromagnet pairs 20 are arranged in the width direction in the electromagnet pair region 20X, the widthwise center of the electromagnet pair 20 which is arranged in the middle and the widthwise center 20Xc of the electromagnet pair region 20X are made to coincide with each other. It is noted that in FIG. 7, the widthwise center in each electromagnet pair 20 is shown by a dotted line, and the middle between the first electromagnet 20A and the second electromagnet 20B is shown by a chain line.

Further, the electromagnetic vibration suppression device 10 is provided with first sensors 30A, 30B and second sensors 30A, 30B for detecting the distance to the steel sheet Sb in a plane opposite to the steel sheet Sb in each first electromagnet 20A and each second electromagnet 20B. In the present embodiment, for example, eddy current type sensors 30A and 30B are applied and these sensors 30A and 30B are disposed in a concave portion (position interposed by the leg portions of the iron core 201) of each electromagnet 20A, 20B. The first sensors 30A, 30B and the second sensors 30A, 30B are provided at opposing locations interposing the steel sheet Sb with their detection surfaces being set coplanar or substantially coplanar with the magnetic pole faces of the corresponding electromagnets 20A and 20B, respectively. The first sensor 30A and the second sensor 30B detect distances d1 and d20 to the steel sheet Sb, and output respective detection results to the control section 40 as detection signals. Further, in the present embodiment, setting is made such that the sensors 30A and 30B can detect the distance to the steel sheet Sb only in a state where the entire detection surface of the sensors 30A and 30B is completely, or substantially completely covered with the steel sheet Sb.

The electromagnetic vibration suppression device 10 relating to the present embodiment includes a control section 40 which is electrically connected to the electromagnets 20A and 20B of each electromagnet pair 20 to control the electromagnetic attraction force of each electromagnet 20A, 20B based on the current amount to be applied to each electromagnet 20A, 20B, and is configured such that the control section 40 can suppress the vibration of the steel sheet Sb traveling between the electromagnets 20A and 20B of each electromagnet pair 20 while taking a desired curved shape in the opposing direction of the first electromagnet 20A and the second electromagnet 20B. Here, the present embodiment adopts, as the desired curved shape of the steel sheet Sb, a partial circular arc (partial elliptic shape) which is bilaterally symmetrical centering on the widthwise center of the steel sheet Sb. Then, a revised target position (a desired revised target position: a position shown by a solid black dot in FIG. 7) of the steel sheet Sb in each electromagnet pair 20 is inputted to the control section 4 such that the steel sheet Sb takes a desired curved shape, and when the steel sheet Sb is not meandering, the current to be applied to each electromagnet 20A, 20B is controlled by the control section 4 such that the relative position of the steel sheet Sb in each electromagnet pair 20 becomes the desired revised target position.

The electromagnetic vibration suppression device 10 relating to the present embodiment is the same as a known electromagnetic vibration suppression device in the point that the control section 40 is electrically connected to each sensor 30A, 30B as well, and the point that the magnetic attraction force of each electromagnet 20A, 20B is controlled so as to suppress the vibration of the steel sheet Sb based on the positional information of the steel sheet Sb detected by each sensor 30A, 30B, but is different from a known electromagnetic vibration suppression device in the following points.

Figure 8:
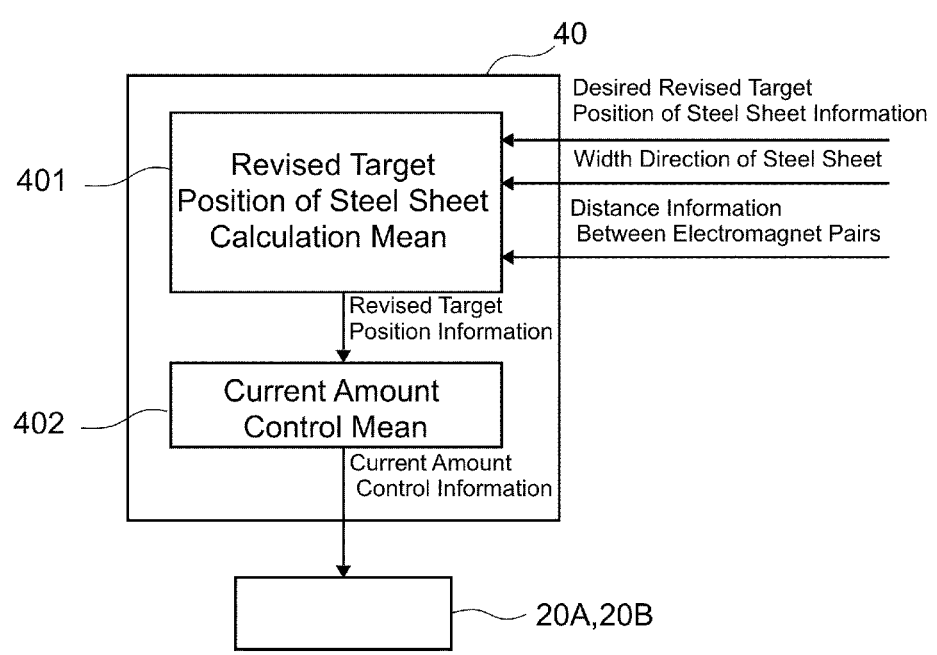
FIG. 8 is a functional block diagram of a control section in the electromagnetic vibration suppression device relating to the same embodiment.

That is, the control section 40 in the electromagnetic vibration suppression device 10 of the present embodiment includes, as shown in FIG. 8, calculation means for revised target position of steel sheet 401 for calculating a revised target position of the steel sheet Sb in each electromagnet pair 20 so as to achieve a desired curved shape based on a displacement amount (meandering amount) in the width direction of the steel sheet Sb which is inputted at least in real time, or at predetermined time intervals when the steel sheet Sb is displaced in the width direction, and current amount control means 402 for separately controlling the current amount to be applied to the electromagnets 20A and 20B making up each electromagnet pair 20 such that the steel sheet Sb that has meandered is moved to the revised target position of the steel sheet Sb determined by the calculation means for revised target position of steel sheet 401. Further, configuration is made such that information of the line L side, that is, a sheet thickness, a sheet width, a kind of steel, tensile force, and the like which are information relating to the traveling steel sheet Sb is inputted to the control section 40 from a host computer (not shown) which is electrically connected to the electromagnetic vibration suppression device 10. Moreover, configuration is made such that the meandering amount (meandering amount information) of the steel sheet Sb based on the edge position Sbe of the steel sheet Sb detected by an apparatus (not shown) such as, for example, an edge position detector electrically connected to the electromagnetic vibration suppression device 10 is inputted in real time or at predefined fixed time intervals to the control section 40. Further, configuration may be such that the meandering amount information is inputted to the control section 40 from a meandering amount detection apparatus which can directly detect the meandering amount of the steel sheet Sb.

Figure 9:
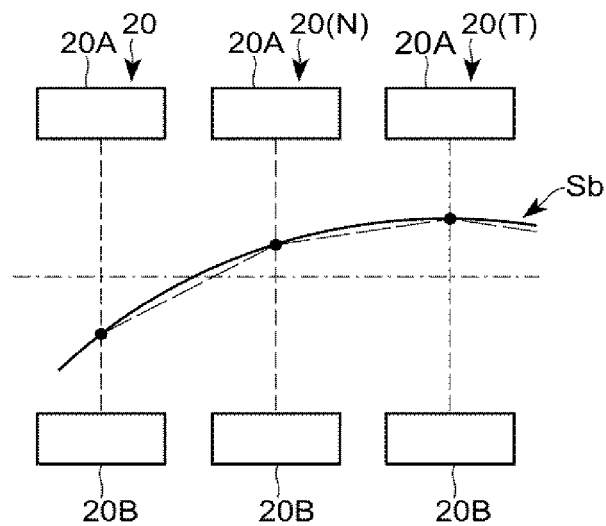
FIG. 9 is partial enlarged view of FIG. 7.

The calculation means for revised target position of steel sheet 401 calculates the revised target position of the steel sheet Sb in each electromagnet pair 20 for each electromagnet pair 20 by utilizing: in addition to the above described meandering amount information of the steel sheet Sb, a desired revised target position (desired revised target position information) which is the revised target position of the steel sheet Sb set up in advance or in real time for each electromagnet pair 20 such that the steel sheet Sb takes a desired curve shape in a non-meandering state; and the distance between adjacent electromagnet pairs 20 (more specifically, the distance between the widthwise centers of the respective electromagnet pairs 20, hereafter referred to as a "distance between electromagnet pairs (distance information between electromagnet pairs)"). The electromagnetic vibration suppression device 10 of the present embodiment is, as shown in FIGS. 9 and 10, which are enlarged views of a portion of FIG. 7, based on a technical idea that approximating the curved shape of the steel sheet Sb traveling in the electromagnet pair region 20X while keeping a normal posture without being displaced in the width direction, that is, a desired curved shape which is the curved shape of the steel sheet Sb before meandering, with a polygonal line shape which links desired revised target positions of the steel sheet Sb in adjacent electromagnet pairs 20 (a polygonal line which successively links desired revised target positions of the steel sheet Sb with a line segment: shown by a dotted line in FIGS. 9 and 10) by straight lines, and preserving the approximated shape of the steel sheet Sb by horizontally moving it in the width direction of the electromagnet pair region 20X as shown by a solid line in FIG. 10, even when the steel sheet Sb meanders will result in that the steel sheet Sb will have the same, or substantially the same, shape as the desired curved shape at a position of meandering so that the revised target position of the steel sheet Sb in each electromagnet pair 20 is determined through computation by the calculation means for revised target position of steel sheet 401 utilizing each desired revised target position of the steel sheet Sb in adjacent electromagnet pairs 20, the meandering amount of the steel sheet Sb, and the distance between electromagnet pairs.

In this way, the calculation means for revised target position of steel sheet 401 performs straight-line interpolation (linear interpolation) of the desired revised target positions of the steel sheet Sb for each electromagnet pair 20 over the range between adjacent electromagnet pairs 20, and derives by computation the revised target positions of the steel sheet Sb that has meandered by utilizing the distance between electromagnet pairs and the meandering amount of the steel sheet Sb. Further, the distance between adjacent electromagnet pairs 20 is predetermined and is inputted into the control section 40 as "distance information between electromagnet pairs". Furthermore, the meandering amount (meandering amount information) of the steel sheet Sb is inputted to the control section 40 in real time or at predetermined time intervals.

Figure 10:
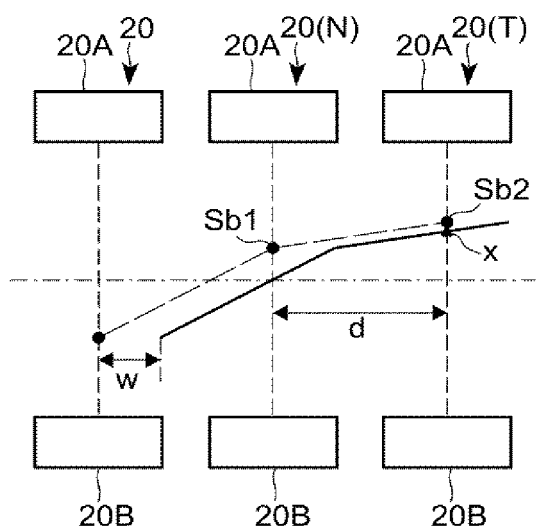
FIG. 10 is a diagram showing a state in which a curved shape of the steel sheet shown in FIG. 7 is approximated by straight lines.
Figure 11:
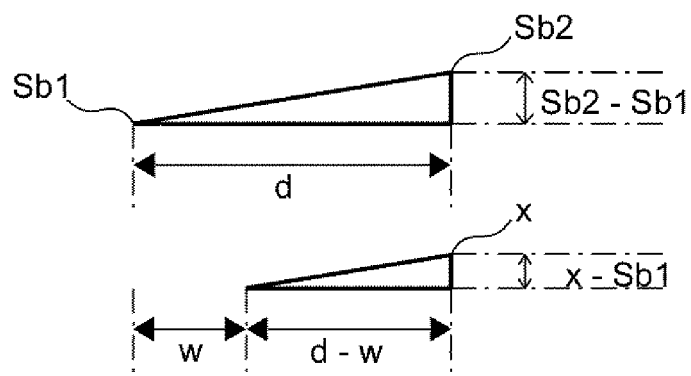
FIG. 11 is a diagram showing a right triangle with a straight line as a side, in which the straight line approximates a curved shape of a steel sheet between adjacent electromagnet pairs before and after it meanders.

Thus, as shown in FIGS. 10 and 11 (FIG. 11 is a part of FIG. 10, and separately shows each of two right triangles in similarity relation to be described below), letting "Sb2" be a desired revised target position of the steel sheet Sb in the electromagnet pair 20(T) for which the revised target position "x" of the steel sheet Sb after being displaced in the width direction (after meandering) is to be determined (hereafter, referred to as a "revised target position calculating electromagnet pair 20(T)"), and letting "Sb1" be a desired revised target position of the steel sheet Sb in the electromagnet pair 20(N) adjacent to the revised target position calculating electromagnet pair 20(T); by taking advantage of the fact that a right triangle (the right triangle on the upper side in FIG. 11) formed of a line segment which can be represented by a coordinate difference "Sb2−Sb1" in the y-axis direction (the direction in which the first electromagnet 20A and the second electromagnet 20B are opposed to each other) when each desired revised target position Sb1, Sb2 is determined as a coordinate on a common x-y plane, a line segment which can be represented as a distance between electromagnet pairs "d" which is the distance between adjacent electromagnet pairs 20(T) and 20(N) in the x-axis direction, and a line segment linking the desired revised target positions Sb2 and Sb1 of the steel sheet Sb in each electromagnet 20(T), 20(N) is in similarity relation with a right triangle (the right triangle on the lower side in FIG. 11) formed of a line segment which can be represented by a difference "x−Sb1" in the y-axis direction when the revised target position "x" of the steel sheet Sb in the revised target position calculating electromagnet pair 20(T) and the desired revised target position "Sb1" of the steel sheet Sb in the electromagnet pair 20(N) are determined as coordinates in a common x-y plane, a line segment in the x-axis direction which can be represented by a difference "d−w" of a distance between electromagnet pairs "d" and a meandering amount "w" of the steel sheet Sb, and a line segment which extends from the revised target position "x" of the steel sheet Sb in parallel with the line connecting the desired revised target positions Sb2 and Sb1 of the steel sheet Sb with each other, the electromagnetic vibration suppression device 10 of the present embodiment performs the following computing operation with the calculation means for revised target position of steel sheet 401 of the control section 40.

To be specific, the calculation means for revised target position of steel sheet 401 of the present embodiment determines a revised target position "x" of the steel sheet Sb in the revised target position calculating electromagnet pair 20(T) taking advantage of the fact that a first relative ratio "(Sb2−Sb1):(x−Sb1)" which is the ratio of the following two terms: a coordinate difference "Sb2−Sb1" in the y-axis direction (the direction in which the first electromagnet 20A and the second electromagnet 20B are opposed to each other) when each desired revised target position Sb1, Sb2 is determined as a coordinate on a common x-y plane, and a difference "x−Sb1" in the y-axis direction when a revised target position "x" of the steel sheet Sb and a desired revised target position "Sb1" of the steel sheet Sb in the electromagnet pair 20(N) are determined as a coordinate on a common x-y plane, equal to a second relative ratio "d:(d−w)" which is the ratio of the following two terms: a distance between electromagnet pairs "d", and a difference "d−w" between the distance between electromagnet pairs "d" and a displacement amount (meandering amount) "w" in the width direction of the steel sheet Sb. That is, the calculation means for revised target position of steel sheet 401 determines by computation the revised target position "x" of the steel sheet Sb in the revised target position calculating electromagnet pair 20(T) from a numerical formula that links the first relative ratio "(Sb2−Sb1):(x−Sb1)" and the second relative ratio "d:(d−w)" by means of an equality, that is, "(Sb2−Sb1):(x−Sb1)=d:(d−w)". Developing the above described numerical formula "(Sb2−Sb1):(x−Sb1)=d:(d−w)" into a numerical equation to determine "x" results in "x=((Sb2−Sb1)(d−w)/d)+Sb1", and by substituting "Sb2", "Sb1", "d", and "w", respectively, with numerical values based on the desired revised target position information of the steel sheet Sb in the adjacent electromagnet pairs 20, the distance information between electromagnet pairs, and the meandering amount information of the steel sheet Sb, which are inputted to the control section 40, it is possible to determine the revised target position "x" of the steel sheet Sb in the revised target position calculating electromagnet pair 20(T). In the present embodiment, through such computing operation, the revised target positions "x" of the steel sheet Sb in the electromagnet pairs 20 are determined respectively as numerical values with the calculation means for revised target position of steel sheet 401, respectively.

The current amount control means 402 temporarily replaces the revised target position of the steel sheet Sb in each electromagnet pair 20 from the desired revised target position to the revised target position "x" determined by the calculation means for revised target position of steel sheet 401, and energizes or deenergizes the electromagnets 20A and 20B making up each electromagnet pair 20 such that the position of the steel sheet Sb in each electromagnet pair 20 moves from the desired revised target position to the revised target position. Further, when it is determined that the electromagnet pair 20 is one in which the steel sheet Sb is not present between the first electromagnet 20A and the second electromagnet 20B based on the meandering amount information, the electromagnets 20A and 20B making up the electromagnet pair 20 and each sensor 30A, 30B may be turned into a non-driven state.

Further, while the control section 40 includes, although not shown, a controller into which output signals from each sensor 30A, 30B are inputted, a sequencer for outputting an instruction or the like relating to a control gain to the controller, and a first and second amplifiers for supplying current respectively to each electromagnet 20A, 20B based on an instruction (current amount control information) relating to the current to be applied to each electromagnet 20A, 20B and outputted from the controller (current amount control information); detailed description on those controller, sequencer, and each amplifier will be omitted.

Next, the use method and action of the electromagnetic vibration suppression device 10 having such configuration will be described.

First, upon activation of the electromagnetic vibration suppression device 10, desired revised target position information of the steel sheet Sb and distance information between electromagnet pairs in each electromagnet pair 20 are inputted to the control section 40, and the control section 40 controls the current amount of each electromagnet 20A, 20B based on the desired revised target position information of the steel sheet Sb in each electromagnet pair 20, making it possible to suppress the vibration of the steel sheet Sb, which travels while passing through and being drawn up from a molten zinc bath Z without meandering as shown in FIGS. 5 and 7, while keeping it in a desired curved shape.

Figure 12:
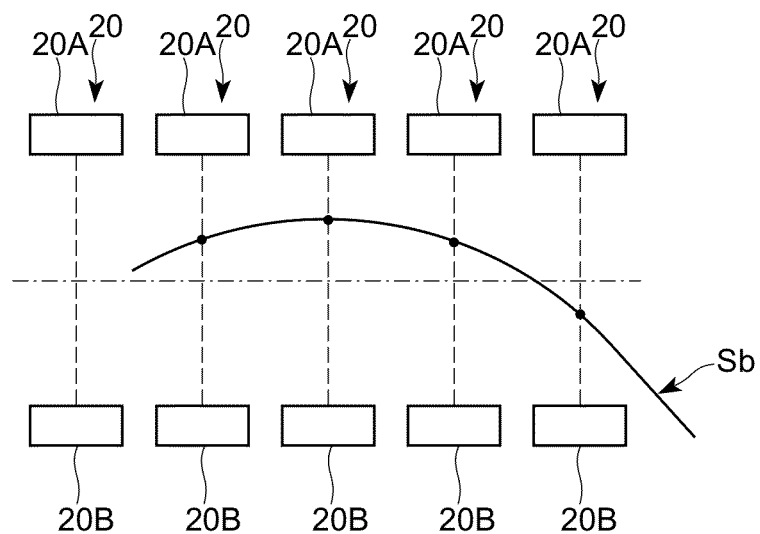
FIG. 12 is a diagram showing the shape of a steel sheet in association with FIG. 7 when vibration suppression control is performed on the steel sheet after it meanders based on a desired revised target position.

On the other hand, even when the traveling steel sheet Sb meanders, in the case where the control section 40 continues to control the current amount of each electromagnet 20A, 20B based on the desired revised target position information of the steel sheet Sb in each electromagnet pair 20, that is, in the case where the control section 40 continues to maintain the revised target position of the steel sheet Sb in each electromagnet pair 20 at the desired revised target position, there is a risk that the steel sheet Sb is deformed into a shape different from a desired curved shape, and appropriate vibration suppression effect is not exerted on the steel sheet Sb as shown in FIG. 12.

Accordingly, when meandering amount information of the traveling steel sheet Sb is inputted to the control section 40 in real time or at predetermined time intervals during operation, and it is determined that the steel sheet Sb is meandering based on the meandering amount information of the steel sheep Sb, the electromagnetic vibration suppression device 10 of the present embodiment executes the electromagnetic vibration suppression control program relating to the present embodiment to make each section operate as described below. That is, the control section 40 determines the revised target position x of the steel sheet Sb in each electromagnet pair 20 through computation by the calculation means for revised target position 401 based on the meandering amount information of the steel sheet Sb, the desired revised target position information of the steel sheet Sb in each electromagnet pair 20, and the distance information between electromagnet pairs (calculation step for revised target position of steel sheet S10: see FIG. 13). To be specific, in the calculation means for revised target position 401, the revised target position "x" of the steel sheet Sb in each electromagnet pair 20(T) is determined by using the above described formula, "x= ((Sb2−Sb1) (d−w)/d)+Sb1", and substituting "Sb2", "Sb1", "d", and "w" with numeral values based on the desired revised target position information of the steel sheet Sb, the distance information between electromagnet pairs, and the meandering amount information of the steel sheet Sb, which are inputted into the control section 40 respectively.

Figure 13:
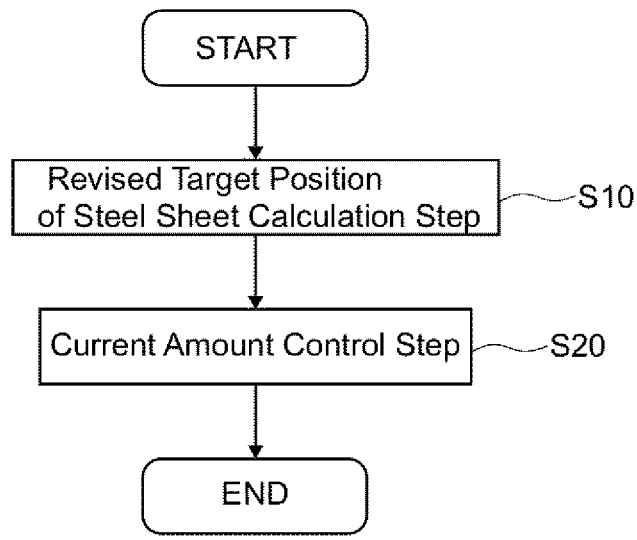
FIG. 13 is a flowchart of an electromagnetic vibration suppression control program to be used in the electromagnetic vibration suppression device relating to the same embodiment.
Figure 14:
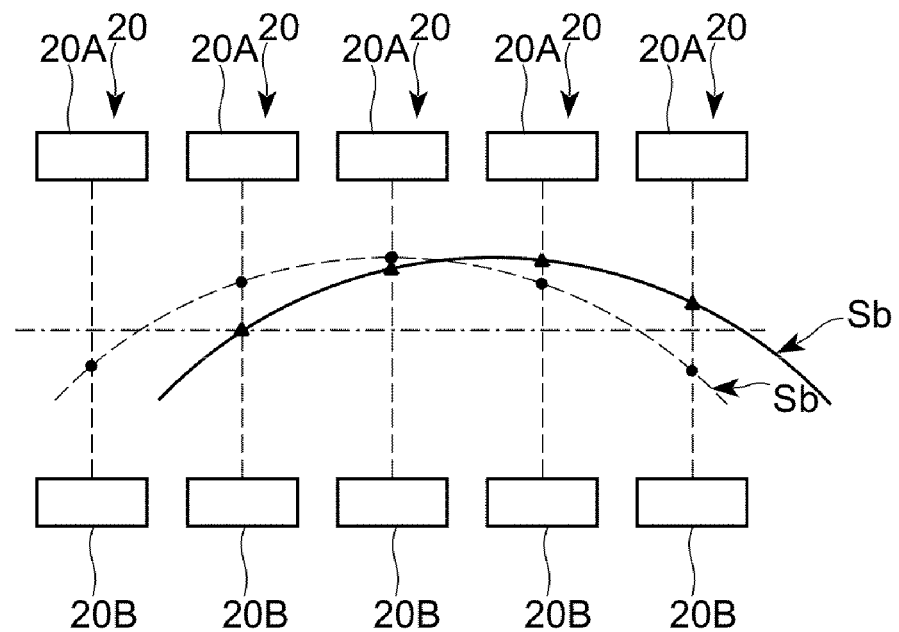
FIG. 14 is a diagram showing the shape of a steel sheet in association with FIG. 7 when vibration suppression control is performed on the steel sheet after it meanders based on a revised target position.

Next, the control section 40 separately controls the current amount to be applied to the electromagnets 20A and 20B with the current amount control means 402 such that the positions of the steel sheet Sb traveling while meandering, with respect to each electromagnet pair 20 are moved respectively to revised target positions, based on the revised target position "x" determined through computation by the calculation means for revised target position 401 at the calculation step for revised target position of steel sheet S10 in place of the desired revised target position as the control data for determining the revised target position of the steel sheet Sb in each electromagnet pair 20 (current amount control step S20; see FIG. 13). Further, an electromagnetic vibration suppression device X of the present embodiment outputs current amount information for separately energizing or deenergizing the first electromagnet 20A and the second electromagnet 20B making up each electromagnet pair 20 respectively, from the control section 4 to each electromagnet 20A, 20B. As a result of that, the electromagnetic vibration suppression device 10 of the present embodiment can keep the steel sheet Sb in a desired curved shape at a position where it has meandered as shown by a solid line of FIG. 14, and can exert appropriate vibration suppression effects on the steel sheet Sb that travels while taking such desired curved shape. Furthermore, in FIG. 14, a steel sheet Sb which travels while keeping a desired curved shape without meandering and keeping a normal posture is shown by a dotted line.

In this way, when the steel sheet Sb that travels while taking a curved shape has meandered, the electromagnetic vibration suppression device 10 of the present embodiment can perform vibration suppression control while maintaining the steel sheet Sb in a desired curved shape at a position where it has meandered.

Further, the electromagnetic vibration suppression device 10 of the present embodiment is configured such that the information on where the steel sheet Sb, which travels while passing through and being drawn up from the molten zinc bath Z, is located in each electromagnet pair 20 can be detected by the first sensor 30A and the second sensor 30B, so that the detection information (position information) from these sensors 30A and 30B is inputted to the control section 40 in real time or at predetermined time intervals. Then, the control section 40 outputs current amount control information to energize or to deenergize the first electromagnet 20A and the second electromagnet 20B based on the above described detection information (position information) and the revised target position information to each electromagnet 20A, 20B thereby controlling the current to be applied to each electromagnet 20A, 20B. As a result of that, the steel sheet Sb is maintained in the same or substantially the same curved shape as a desired curved shape by the magnetic attraction force of each electromagnet 20A, 20B not only when traveling without meandering, but also when meandering, and thus the vibration during traveling is suppressed.

Therefore, by making the steel sheet Sb, which travels while passing through and being drawn up from the molten zinc bath Z, curved in the thickness direction, it is possible to maintain the rigidity of the steel sheet Sb and, at the same time, to maintain the distance between the steel sheet Sb of a curved shape and an ejection hole of each nozzle A1 making up the air knife portion A within a presumed fixed range, thereby preventing the fluctuation of the ejection force which acts on the steel sheet Sb and thus making the plating thickness uniform or substantially uniform.

In this way, since the electromagnetic vibration suppression device 10 of the present embodiment uses the control section 40 which includes calculation means for revised target position of steel sheet 401 for determining the revised target position x of the steel sheet Sb in each electromagnet pair 20 by computation based on the displacement amount (meandering amount) in the width direction of the steel sheet Sb which is inputted in real time or at predetermined time intervals, and current amount control means 402 for separately controlling the current amount to be applied to the electromagnets 20A and 20B so as to move the steel sheet Sb that has meandered to the revised target position x of the steel sheet Sb determined at the calculation means for revised target position of steel sheet 401; even when the steel sheet Sb traveling in a curved shape meanders, it is possible to guide the steel sheet Sb at the meandering position to become a shape which is the same or substantially the same as the desired curved shape, and thus appropriately suppress the vibration during traveling even for the steel sheet Sb that has meandered in the width direction. Therefore, it is possible to effectively suppress the vibration even of the steel sheet Sb which travels while meandering in the width direction, not to mention the steel sheet Sb that travels while keeping a normal posture with a desired curved shape, thus providing an excellent utility. Therefore, when such electromagnetic vibration suppression device 10 is arranged in a steel sheet continuous plating line L along with an air knife portion A for blowing off excessive molten metal adhered to the steel sheet Sb, it is possible to effectively suppress the vibration of the steel sheet Sb, which travels while taking a desired curved shape, or a curved shape coincident or substantially coincident with the desired curved shape, by the electromagnetic vibration suppression device 10, and as a result of that, it becomes possible to maintain the distance between the steel sheet Sb and the air knife portion A within a presumed fixed range, thereby preventing the fluctuation of ejection force acting on the steel sheet Sb and making the plating thickness uniform or substantially uniform.

Further, since the electromagnetic vibration suppression program relating to the present embodiment undergoes the calculation step for revised target position of steel sheet S10 to determine by computation a revised target position x of the steel sheet Sb in each electromagnet pair 20 such that it becomes a desired curved shape based on the meandering amount of the steel sheet Sb which is inputted in real time or at predetermined time intervals, and the current amount control step S20 of separately controlling the current amount to be applied to the electromagnets 20A and 20B such that the steel sheet Sb that has meandered is moved to the revised target position x of the steel sheet Sb determined in the calculation step for revised target position of steel sheet S10, it is possible, as described above, to appropriately suppress the vibration of the steel sheet Sb that travels while keeping a normal posture without meandering, and the steel sheet Sb that travels while meandering in the width direction.

Furthermore, the electromagnetic vibration suppression device of the second aspect of the present invention will not be limited to the embodiment described above. For example, as the desired curved shape of steel sheet, in place of the partial circular arc (partial elliptic arc) shape as shown in the embodiment described above, a shape (wave-like shape, S-shape) which is made up by combining a plurality of partial circular arcs, and a curved shape which is not bilaterally symmetrical centering on the widthwise center may be adopted.

Further, the output source for outputting the meandering amount of steel sheet to the control section in real time or at predetermined time intervals, and the output source for outputting the desired revised target position of steel sheet and the distance between electromagnet pairs to the control section may be respectively a separate device from the electromagnetic vibration suppression device, or part of the electromagnetic vibration suppression device. Further, configuration may be such that the current amount control means controls the current amount of each electromagnet by adjusting the output intensity in addition to turning On or Off the current output.

Further, the number of electromagnet pairs disposed in the width direction of steel sheet, and the pitch between electromagnet pairs adjacent to each other in the width direction of steel sheet (a numerical value as the basis of distance information between electromagnet pairs) may be appropriately changed.

Further, the electromagnetic vibration suppression device may not be provided with sensors in association with the respective electromagnets. This case corresponds to a sensorless electromagnetic vibration suppression device.

Further, although in the second embodiment described above, the molten metal bath is exemplified by a molten zinc bath, in place of this, for example, a bath that stores for example molten tin or aluminum, or resin paint may be applied. The electromagnetic vibration suppression device of the present invention may adopt as the surface coating treatment on a steel sheet, besides coating by plating, other surface coating treatment such as surface coloring processing in which surface coating treatment is performed by spraying an appropriate surface treatment material on a steel sheet. Furthermore, the electromagnetic vibration suppression device of the present invention can suitably suppress the vibration of a steel sheet that travels at a time before subjected to a surface coating treatment, and also the vibration of a steel sheet that travels in a predetermined direction without being subjected to a surface coating treatment.

Further, the electromagnetic vibration suppression device of the second aspect of the present invention may be a device for controlling the suppression of vibration of a steel sheet which is configured to pass through between electromagnets while being pulled down after subjected to a surface coating treatment, or a device for controlling the suppression of vibration of a steel sheet which is configured to pass through between electromagnets while being moved horizontally after subjected to a surface coating treatment. Further, although a case where the steel sheet passing through between electromagnets takes a vertical posture has been described in the above described second embodiment, in the present invention, the steel sheet may be configured to pass through between electromagnets while taking a posture other than a vertical posture, for example, either of a horizontal posture and a slanted posture.

Furthermore, specific configurations of each part will not be limited to those of the above descried second embodiment, various modifications may be made within a range not departing from the spirit of the second aspect of the present invention.

REFERENCE SIGNS LIST

1 Electromagnetic vibration suppression device
2 Electromagnet pair
2A, 2B Electromagnet
4 Control section
41 Edge position calculation means
42 Current amount control means
Sa Steel sheet
10 Electromagnetic vibration suppression device
20 Electromagnet pair
20A, 20B Electromagnet
40 Control section
401 Calculation means for revised target position of steel sheet
402 Current amount control means
Sb Steel sheet

We claim:
1. An electromagnetic vibration suppression device for suppressing vibration of a traveling steel sheet, comprising:
a plurality of electromagnet pairs disposed in a width direction of a steel sheet, each electromagnet pair including a combination of electromagnets oppositely disposed to each other in a thickness direction of the steel sheet traveling in a predetermined direction,
a plurality of sensor pairs, each sensor detecting a distance to the steel sheet, and each sensor disposed on each of the electromagnets to face the steel sheet, and each sensor pair disposed at an opposing location to interpose the steel sheet between two sensors in pair; and
a control section adapted to control current to be applied to each electromagnet to suppress vibration of the steel sheet traveling between electromagnets of each of the electromagnet pairs, wherein the control section comprises edge position calculation means and current amount control means, the edge position calculation means is adapted to determine an edge position of the steel sheet by computation by a formula of ½ W±α, in which W is an inputted width dimension of the steel sheet from an external of the electromagnetic vibration suppression device, and α is a displacement amount in a width direction of the steel sheet, the displacement amount being inputted in real time or at predetermined time intervals from an external of the electromagnetic vibration suppression device, the current amount control means is adapted to separately control a current amount to be applied to the electromagnets based on the edge position of the steel sheet determined by the edge position calculation means, among said plurality of electromagnet pairs, the current amount control means detects an edge-position detecting electromagnet pair in which the edge position is disposed therebetween, the edge position obtained by the formula above in the edge position calculation means, and then, a driving condition is made on the electromagnets making up the electromagnet pairs located at a side closer to a widthwise center than the edge-position detecting electromagnet pair, while a non-driving condition is made on other electromagnets located at a side closer to the widthwise end than the edge-position detecting electromagnet pair.

2. The electromagnetic vibration suppression device according to claim 1, wherein
the current amount control means outputs a current control signal for energizing or deenergizing each electromagnet.

3. The electromagnetic vibration suppression device according to claim 2, wherein
the current amount control means outputs a current control signal for energizing, among each electromagnet, an electromagnet which is present on the side of a widthwise center of the steel sheet with respect to the edge position of the steel sheet determined by the edge position calculation means, and deenergizing all other electromagnets.

4. The electromagnetic vibration suppression device according to claim 3, wherein
the current amount control means detects an electromagnet pair in which an edge position of the steel sheet determined by the edge position calculation means is present between electromagnets, and outputs a current control signal, the current control signal being adapted to:
energize the electromagnets making up the detected electromagnet pair, when it is determined that in the detected electromagnet pair, the edge position is present on the side of the widthwise end of an electromagnet pair region, in which the plurality of electromagnet pairs are disposed, with respect to a predetermined range which is set centering on the widthwise center of each electromagnet making up the concerned electromagnet pair, and
deenergize the electromagnets making up the detected electromagnet pair, when it is determined that the edge position is present on the side of the widthwise center of the electromagnet pair region with respect to the predetermined range.

5. An non-transitory computer readable medium storing computer program to be applied to the electromagnetic vibration suppression device according to claim 1, the program comprising:

an edge position calculation step of determining an edge position of the steel sheet by computation by a formula of ½ W±α, in which W is an inputted width dimension of the steel sheet from out of the electromagnetic vibration suppression device, and α is a displacement amount in a width direction of the steel sheet, the displacement amount being inputted in real time or at predetermined time intervals from out of the electromagnetic vibration suppression device, and a current amount control step of separately controlling a current amount to be applied to the electromagnets based on the edge position of the steel sheet determined in the edge position calculation step, wherein among said plurality of electromagnet pairs, the current amount control means detects an edge-position detecting electromagnet pair in which the edge position is disposed therebetween, the edge position obtained by the formula above in the edge position calculation means, and then, a driving condition is set on the electromagnets making up the electromagnet pairs located at a side closer to a widthwise center than the edge-position detecting electromagnet pair, while a non-driving condition is set on other electromagnets located at a side closer to the widthwise end than the edge-position detecting electromagnet pair.

6. An electromagnetic vibration suppression device for suppressing vibration of a traveling steel sheet, comprising:
a plurality of electromagnet pairs disposed in a width direction of a steel sheet and each including a combination of electromagnets oppositely disposed to each other in the thickness direction of the steel sheet traveling in a predetermined direction, and
a control section adapted to control current to be applied to each electromagnet to suppress vibration of the steel sheet traveling between electromagnets of each of the electromagnet pairs while taking a shape curved in the opposing direction of the electromagnets, wherein
the control section comprises calculation means for revised target position of steel sheet and current amount control means,
the calculation means for revised target position of steel sheet is adapted to calculate a revised target position of steel sheet between electromagnets making up each electromagnet pair such that the steel sheet takes a desired curved shape at a preset, based on a displacement amount in the width direction of the steel sheet, the displacement amount being inputted in real time or at predetermined time intervals, and
the current amount control means is adapted to separately control a current amount to be applied to electromagnets making up each electromagnet pair such that the steel sheet displaced in the width direction is moved to the revised target position of steel sheet in each electromagnet pair determined by the calculation means for revised target position of steel sheet while the steel sheet is maintaining the position in width direction, then correct the steel sheet at the desired curved shape at a preset, the steel sheet traveling while keeping the desired curved shape.

7. The electromagnetic vibration suppression device according to claim 6, wherein
approximating the desired curved shape of the steel sheet at a time before being displaced in a width direction by a straight line linking desired revised target positions of steel sheet in the adjacent electromagnet pair, the calculation means for revised target position of steel sheet calculates a revised target position of the steel sheet for each electromagnet pair by utilizing each desired revised target position of steel sheet in an electromagnet pair for which a revised target position of steel sheet is determined, and an electromagnet pair adjacent to the concerned electromagnet pair, a displacement amount in the width direction of the steel sheet, and a distance between adjacent electromagnet pairs.

8. The electromagnetic vibration suppression device according to claim 6 or 7, wherein the calculation means for revised target position of steel sheet determines a desired revised target position of steel sheet in an electromagnet pair for which the revised target position of steel sheet is determined, and a desired revised target position of steel sheet in an electromagnet pair adjacent to the concerned electromagnet pair, respectively as coordinates to calculate a difference of these coordinates, and calculate a difference between the revised target position of steel sheet in the electromagnet pair for which the revised target position is determined and the desired revised target position of steel sheet in the electromagnet pair adjacent to the concerned electromagnet pair, and the calculation means for revised target position of steel sheet determines each revised target position of steel sheet in each electromagnet pair by taking advantage of the fact that a first relative ratio which is the ratio of the two calculated differences is equal to a second relative ratio which is the ratio of a separation distance of adjacent electromagnet pairs and a value calculated by subtracting a displacement amount in the width direction of steel sheet from the separation distance.

9. An non-transitory computer readable medium storing computer program to be applied to the electromagnetic vibration suppression device according to claim 6, the program comprising:

a calculation step for revised target position of steel sheet of calculating a revised target position of steel sheet between electromagnets making up each electromagnet pair such that the steel sheet takes a desired curved shape at a preset, based on a displacement amount in the width direction of the steel sheet, the displacement amount being inputted in real time or at predetermined time intervals, and a current amount control step of separately controlling a current amount to be applied to electromagnets making up each electromagnet pair such that the steel sheet displaced in the width direction is moved to the revised target position of steel sheet in each electromagnet pair determined in the calculation step for revised target position of steel sheet while the steel sheet is maintaining the position in width direction, then correct the steel sheet at the desired curbed shape at a preset the steel sheet that travels while keeping the desired curved shape.

10. The electromagnetic vibration suppression device according to claim 6, further comprising a plurality of sensor pairs, each sensor detecting a distance to the steel sheet, and each sensor disposed on each of the electromagnets to face the steel sheet, and each sensor pair disposed at an opposing location to interpose the steel sheet between two sensors in pair, wherein the displacement amount in a width direction of the steel sheet is inputted from an external of the electromagnetic vibration suppression device.

\* \* \* \* \*